(12) United States Patent
Lefevre et al.

(10) Patent No.: US 10,527,400 B2
(45) Date of Patent: Jan. 7, 2020

(54) HYBRID MOBILE ENTITY, METHOD AND DEVICE FOR INTERFACING A PLURALITY OF HYBRID MOBILE ENTITIES WITH A COMPUTER SYSTEM, AND A SET FOR A VIRTUAL OR AUGMENTED REALITY SYSTEM

(71) Applicant: EPAWN, Paris (FR)

(72) Inventors: Valentin Lefevre, Puteaux (FR); Laurent Chabin, Asnieres sur Seine (FR); Christophe Duteil, Paris (FR)

(73) Assignee: STARBREEZE PARIS, Paris (FR)

( * ) Notice: Subject to any disclaimer, the term of this patent is extended or adjusted under 35 U.S.C. 154(b) by 332 days.

(21) Appl. No.: 15/388,592

(22) Filed: Dec. 22, 2016

(65) Prior Publication Data

US 2017/0184387 A1    Jun. 29, 2017

(30) Foreign Application Priority Data

Dec. 24, 2015 (FR) .................................. 15 63352

(51) Int. Cl.
 *G01B 7/004* (2006.01)
 *H04W 4/029* (2018.01)
 *H04W 52/02* (2009.01)
(52) U.S. Cl.
 CPC ............ *G01B 7/004* (2013.01); *H04W 4/029* (2018.02); *H04W 52/0229* (2013.01); *G01B 2210/58* (2013.01)
(58) Field of Classification Search
 CPC ..... G01B 7/004; G01B 2210/58; H04W 4/02; H04W 52/0229; G06F 3/011; G06F 3/046; G06F 3/0346; G06F 3/038; Y02D 70/00; Y02D 70/164; Y02D 70/142; Y02D 70/144
 See application file for complete search history.

(56) References Cited

U.S. PATENT DOCUMENTS

| 2009/0054077 | A1* | 2/2009 | Gauthier | G06F 3/014 455/456.1 |
|---|---|---|---|---|
| 2009/0058855 | A1* | 3/2009 | Mishra | B65G 13/10 345/427 |
| 2013/0157690 | A1* | 6/2013 | Lefevre | A63F 3/00643 455/456.1 |

FOREIGN PATENT DOCUMENTS

| GB | 2 428 802 A | 2/2007 |
|---|---|---|
| WO | 2012/028827 A1 | 3/2012 |

OTHER PUBLICATIONS

French Search Report dated Aug. 24, 2016, in corresponding priority application.

* cited by examiner

*Primary Examiner* — Mischita L Henson
(74) *Attorney, Agent, or Firm* — Young & Thompson

(57) ABSTRACT

Disclosed is a hybrid mobile entity for a device for interfacing a plurality of mobile entities with a computer system, the hybrid mobile entity including at least one location module including: a unit for emitting an electromagnetic signal making it possible to determine the position of the location module; and a unit for receiving an activation signal and, according to at least one item of information of the activation signal, activating the unit for emitting an electromagnetic signal. The hybrid mobile entity further including: an inertial measurement unit rigidly joined to the location module; and a unit for communication with the device, for transmitting data relative to a movement of the inertial measurement unit.

18 Claims, 12 Drawing Sheets

Fig. 1
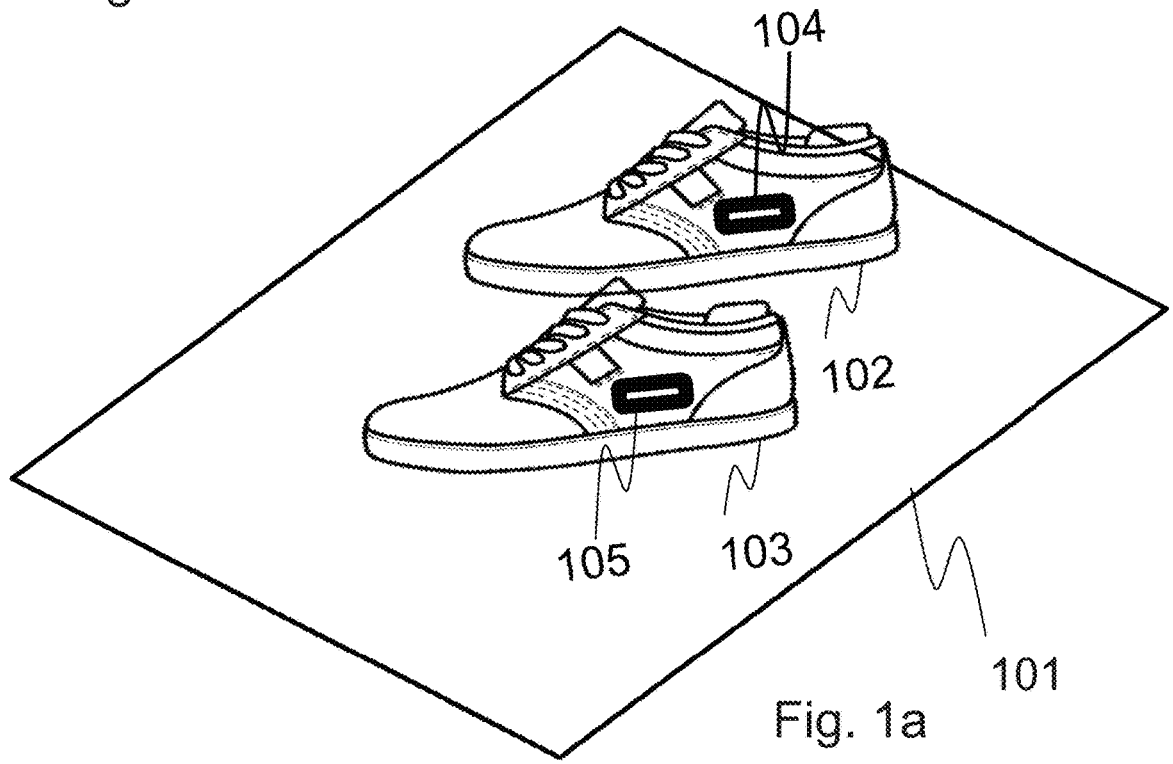
Fig. 1a
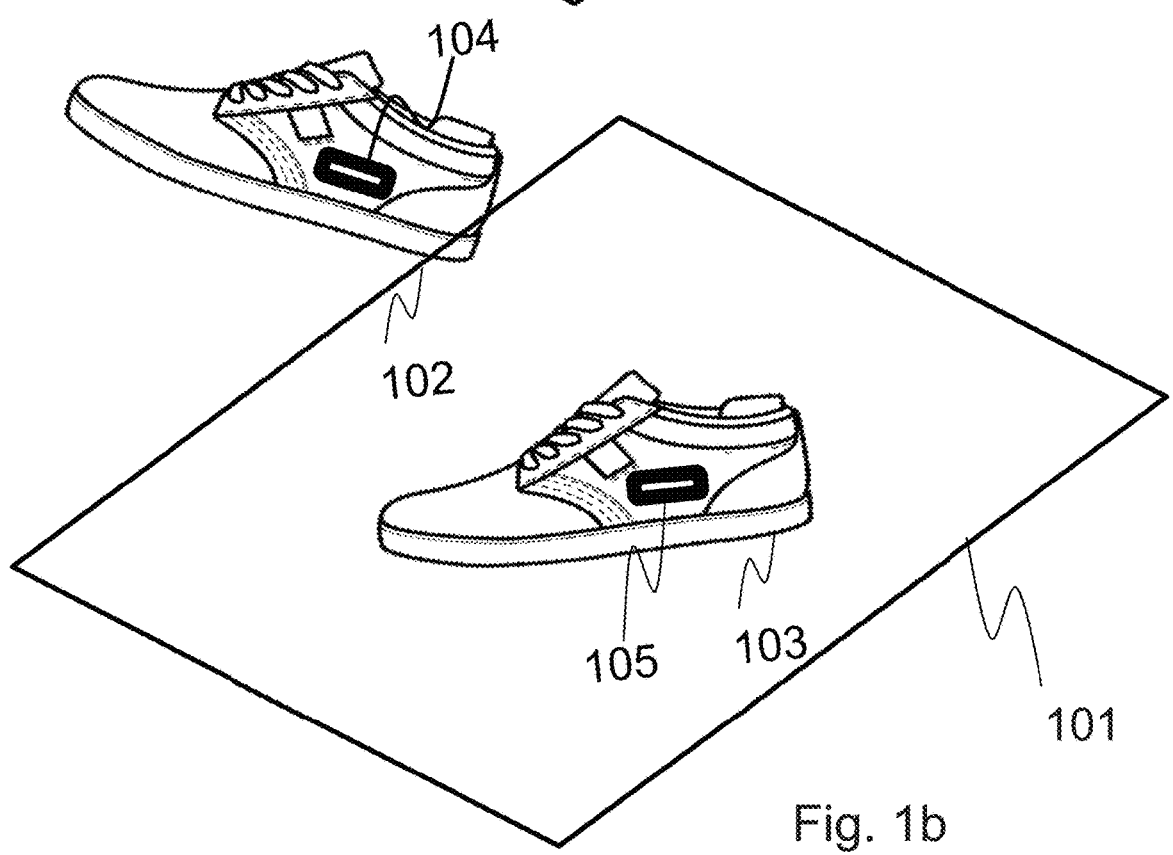
Fig. 1b

HYBRID MOBILE ENTITY, METHOD AND DEVICE FOR INTERFACING A PLURALITY OF HYBRID MOBILE ENTITIES WITH A COMPUTER SYSTEM, AND A SET FOR A VIRTUAL OR AUGMENTED REALITY SYSTEM

FIELD OF THE INVENTION

The present invention concerns the location of mobile entities by a computer system, in particular in the field of smart floors. It has applications in particular in the field of virtual reality or augmented reality. The invention particularly relates to a hybrid mobile entity, a device and a method for interfacing a plurality of hybrid mobile entities with a computer system.

CONTEXT OF THE INVENTION

In numerous situations, it may be necessary, for a computer system, to detect the location (e.g. position, orientation, altitude) of mobile entities to enable it to react accordingly, and enable the use of these mobile entities as an interface of a computer system.

The present invention is particularly concerned with the detection of mobile entities for example carried by human users or by robots. These users may for example move over a playing terrain or within a building Furthermore, these users may perform movements of large amplitude, which imposes particular constraints, in particular in terms of position tracking.

Location systems exist which enable continuous tracking of large amplitude movements.

One solution consists of using an inertial measurement unit, which is defined as a set of sensors (for example gyroscopes and accelerometers, magnetometers) enabling parameters of the movement of a mobile entity to be measured. However, in practice, the operation diverges from ideal equations due to errors which affect the measurements of the rotations and of the accelerations (for example bias, noise, scale factors, non-linearity) and which give rise to drift over time in the estimations for example of the velocity and of the position of the mobile entity considered. Also, shocks suffered by the mobile entity may cause large errors in the measurements by the inertial measurement unit.

Thus, such a solution is not adapted to applications of which the duration exceeds a few minutes or even a few seconds, for example such as virtually or augmented reality applications.

Another possible solution not suffering from such drift is location by a Differential Global Positioning System which uses a network of fixed reference stations transmitting to a receiver the difference between the positions indicated by the satellites and their known real positions. The receiver thus receives the difference between the pseudo distances measured by the satellites and the true pseudo distances and can thus correct its own measurements.

However, this type of location is not adapted to the location of mobile entities situated within a building. Furthermore, the accuracy of the Differential Global Positioning System is of the order of about ten centimeters, which may be insufficient for certain applications, in particular for virtually reality or augmented reality. Moreover, this technology is very sensitive to the presence of metal objects, which can cause the position measurements to be false.

There are other location technologies, in particular operating by terrestrial triangulation, for example UWB (Ultra Wide Band) or for instance iBeacon, enabling the location of entities inside buildings. In principle, these technologies are used for the positioning of mobile devices carrying beacons able to emit data sensed by receivers positioned in the environment, for example within a building. These receivers evaluate the distance separating them respectively from the beacons by measuring the propagation time of the signals, which enables the system to compute the position of the mobile devices by triangulation.

These technologies have the drawback of requiring the calibration of the beacons. Furthermore, the accuracy of the position computed by triangulation is of the order of 15 cm, which may be insufficient for certain applications, for example for virtual reality or for augmented reality. Furthermore, the triangulation methods used are poorly adapted to the location of a plurality of entities, problems of congestion of the system being rapidly observed. These technologies are also sensitive to the presence of metal entities (for example partitions with a metal structure, metal beams or for instance metal cabinets) which considerably perturb position measurements on account of the multiple paths of the waves. The presence of these metal entities strongly reduces the accuracy of the final computation of the position (accuracy of more than 1 m).

In the particular field of virtual reality and augmented reality applications, location solutions exist which are based on optical means, in particular cameras.

However, these solutions require particular installations (e.g. rails of LEDs disposed in the environment, numerous cameras sometimes including computing means for the analysis of images in real time, or for instance constellations of infra-red targets enabling cameras to compute positions) and are often very costly and thus not very realistic for applications for the general public. Furthermore, these solutions are particularly sensitive to the environment in which the mobile entity moves, in particular to the visual quality of the environment, which may be altered for example by smoke, fog, or for instance low light levels. They are also sensitive to the masking of the optical means by physical obstacles, typically by another mobile entity, and are thus poorly adapted to tracking a plurality of mobile entities over time.

SUMMARY OF THE INVENTION

The invention enables at least one of the problems set forth above to be solved.

The invention thus relates to a hybrid mobile entity for a device for interfacing a plurality of hybrid mobile entities with a computer system, said hybrid mobile entity comprising at least one location module comprising the following means:
  means for emitting an electromagnetic signal making it possible to compute (or determine) the position of said location module; and,
  means for receiving an activation signal and, according to at least one item of information of said activation signal, activating said means for emitting an electromagnetic signal;
  said hybrid mobile entity being characterized in that it further comprises:
  an inertial measurement unit rigidly joined to said location module; and
  means for communication with said device, for transmitting data relative to a movement of the inertial measurement unit.

The hybrid mobile entity according to the invention thus enables a computer system to simply and effectively determine the position of a high number of mobile entities that are able to be used to interact with that computer system, even when some of those mobile entities are momentarily outside the range of the interfacing device such that their location module cannot send any signal at a particular time.

As a matter of fact, by virtue of the use of an inertial measurement unit rigidly joined to a given location module, even though that module cannot emit signal enabling a position information item to be computed, it is nevertheless possible to compute that position information item from movement data of the inertial measurement unit and from an earlier position information item computed at a time at which the device could receive a signal emitted by that location module. Since this type of computation is based on two types of data, i.e. a position information item computed from a signal received from the location module and from movement data of the inertial measurement unit rigidly joined to that module, it is called a hybrid computation.

Advantageously the position information items which could be deduced from the movement data of the inertial measurement unit will represent the position of the hybrid mobile entity since the latter is fixed relative to (rigidly linked to) the inertial measurement unit.

Furthermore, the combined use of the inertial measurement unit and of the location module enables the phenomenon of drift of the inertial measurement unit data to be avoided.

According to a particular embodiment, the communication means of the hybrid mobile entity are furthermore configured to receive at least one position information item of said location module. For example, this position information item was computed by the device from electromagnetic signals emitted by the location module.

According to a particular embodiment, the hybrid computation of the position is carried out at the hybrid mobile entity.

In this embodiment, the hybrid mobile entity further comprises means for hybrid computation of a new position information item of said location module, based on the position information item received and movement data of the inertial measurement unit.

The communication means may then furthermore be configured to transmit said new position information item of said location module, for example to the device.

According to a particular embodiment, the communication means of the hybrid mobile entity are configured to receive adjustment data for adjusting the movement data of the inertial measurement unit, said adjustment data being based on a position information item computed from an electromagnetic signal emitted by said location module.

These adjustment data are for example a position information item computed by the device from electromagnetic signals emitted by the location module at a particular time.

According to a particular embodiment, the hybrid mobile entity is configured to adjust the movement data of the inertial measurement unit at each activation of the location module. In this embodiment, each position information item computed by the device from electromagnetic signals emitted by the location module is sent to the hybrid mobile entity.

The means for emitting a signal comprise for example a solenoid emitting an electromagnetic field when it is activated, to enable determination of the position and/or orientation of the hybrid mobile entity. As a variant, the means for emitting a signal may include any other means for emitting an electromagnetic field.

The hybrid mobile entity may furthermore comprise means for remote powering to electrically power components of the location module.

For example, the hybrid mobile entity may comprise at least one solenoid, excitable by induction. The hybrid mobile entity may comprise any other means for remote powering, for example antennae using the Powercast technology (Powercast is a trademark).

The hybrid mobile entity may comprise means for storage energy such as a battery, a cell or a capacitor.

The invention also relates to a device for interfacing a plurality of hybrid mobile entities with a computer system, the device comprising a detection surface and being characterized in that it comprises the following means:
  means for sequentially activating at least one location module integrated into each hybrid mobile entity of said plurality of hybrid mobile entities, a single location module being able to be activated at a particular time;
  means for receiving at least one electromagnetic signal from said at least one activated location module;
  means for computing in real time, from said at least one received electromagnetic signal, at least one position information item, in a frame of reference associated with said detection surface, of a hybrid mobile entity comprising said activated location module;
  communication means for receiving data relative to a movement of an inertial measurement unit rigidly joined to said at least one activated location module in the absence of reception of an electromagnetic signal on activation of said at least one location module.
  means for hybrid computation in real time, from received movement data and from the computed position information item, of a new position information item of said at least one activated location module.

According to a particular embodiment, the communication means of the device are furthermore configured for:
  transmitting the position information item computed from the received electromagnetic signal, to the hybrid mobile entity; and
  for receiving said new position information item, computed by the hybrid mobile entity from the transmitted position information item.

According to a particular embodiment, the communication means of the device are configured to transmit adjustment data for adjusting the movement data of the inertial measurement unit, said adjustment data being based on a position information item computed from a received electromagnetic signal.

These adjustment data are for example a position information item computed by the device from electromagnetic signals emitted by the location module at a particular time.

The invention also relates to a device comprising a plurality of devices as described above, a device of the plurality of devices controlling at least some means implemented in the other devices of the plurality of devices. It is thus possible to increase the size of the area over which the hybrid mobile entities are able to move.

Advantageously, the means for sequentially activating at least one location module could comprise means for emitting a high frequency signal comprising an identifier of a location module. The device could thus easily select a particular location module according to its identifier.

The received signal could for example be an electromagnetic field. The means for receiving at least one signal of an activated location module could also comprise a conductive grid formed from a set of conductive loops, and the device could then comprise means for sequentially selecting each conductive loop of that set of conductive loops. It would thus be possible to determine the position of a location module according to characteristics of the received signals and of the selected conductive loops.

Advantageously, the device could also comprise means for filtering the received signal in order to eliminate extraneous signals.

The detection surface for example comprises a surface of PET plastic on which the conductive grid has been formed by silver screen-printing. For example, the conductive grid has been formed by printing using a conductive ink jet containing particles of silver.

As a variant, the detection surface for example comprises a surface of PET plastic on which the conductive grid has been formed by copper tracks. According to another variant, the conductive grid is formed by weaving with a conductive wire.

According to still another variant, the detection surface comprises for example a PCB type board (PCB standing for Printed Circuit Board) for electromagnetic reception, which may be flexible or rigid.

The invention also relates to a method for interfacing a plurality of hybrid mobile entities with a computer system, the method being characterized in that it comprises the following steps:

obtaining at least one position information item of a hybrid mobile entity of said plurality, said hybrid mobile entity comprising at least one activated location module, the at least one position information item being computed from at least one electromagnetic signal emitted by said at least one activated location module integrated into the hybrid mobile entity, it being possible for only one location module to be activated at a particular time;

next, in the absence of later reception of an electromagnetic signal on activation of said at least one location module:

obtaining data relative to a movement of an inertial measurement unit rigidly joined to said at least one activated location module; and performing hybrid computation in real time, from obtained movement data and from the obtained position information item, of a new position information item of said at least one activated location module.

According to a particular embodiment, the method further comprises a step of adjusting the movement data of the inertial measurement unit.

These data are for example computed from one or more position information items computed from signals received from the location module.

According to a first embodiment, the method further comprises a step of storing said obtained position information item with the date of its computation, said adjusting step being implemented on the basis of said stored position information item.

According to a second embodiment, the method further comprises a step of receiving an information item indicating a failure in reception of an electromagnetic signal from said at least one activated location module.

In this second embodiment, the method may further comprise a step of receiving adjustment data, said adjusting step being implemented on the basis of the received adjustment data.

In this second embodiment, the method may further comprise a step of transmitting the new computed position information item.

The hybrid mobile entity or the device, according to the embodiments, may thus adjust the movement data of the inertial measurement unit using the adjustment data. The problems of drift over time, that are sometimes observed on prolonged use of an inertial measurement unit or shock undergone by it, are thus avoided.

Advantageously, such a method could further comprise a step of verifying the validity of the at least one location module, the sequential step of activating the location module being carried out in response to the validity verifying step. Thus, only the positions and/or orientations of the hybrid mobile entities situated within the (electromagnetic) range of the detection surface would be determined.

Such a method could thus comprise a step of assigning a state of validity or invalidity to the location module, the state of validity or invalidity being determined according to the position information item or items.

The method could thus comprise a sequential selecting step for selecting a plurality of receivers, said at least one signal being received by at least one receiver selected from the plurality of receivers. It would thus be possible to determine the position of a location module according to characteristics of the received electromagnetic signals and of the selected receivers.

The invention also relates to a set for a virtual or augmented reality system, adapted to equip a moving user, said system comprising:

at least one hybrid mobile entity such as referred to above, configured to be carried by the user;

at least one interfacing device such as referred to above;

a set of virtual or augmented reality headgear, adapted to be worn by the user, said headgear being connected to said hybrid mobile entity or to said interfacing device so as to enable the tracking of the position of the headgear according to the relative position of the hybrid mobile entity and of the headgear and according to the position of the hybrid mobile entity.

According to a particular embodiment, this assembly further comprises a magnetic positioning system comprising a means for emitting a magnetic field in a plurality of directions and a plurality of receiving means of said magnetic field emitted by the emitting means, said magnetic positioning system being configured to determine the position of at least one of the receiving means in a frame of reference centered on the emitting means, based on the magnetic field received by said receiving means.

BRIEF DESCRIPTION OF THE DRAWINGS

Other advantages, objects and features of the present invention will emerge from the following detailed description, given by way of non-limiting example, relative to the accompanying drawings in which:

FIG. 1, composed of FIGS. 1a and 1b, is a diagram of a context in which embodiments of the invention can advantageously be implemented;

DETAILED DESCRIPTION OF THE INVENTION

Figure 2:
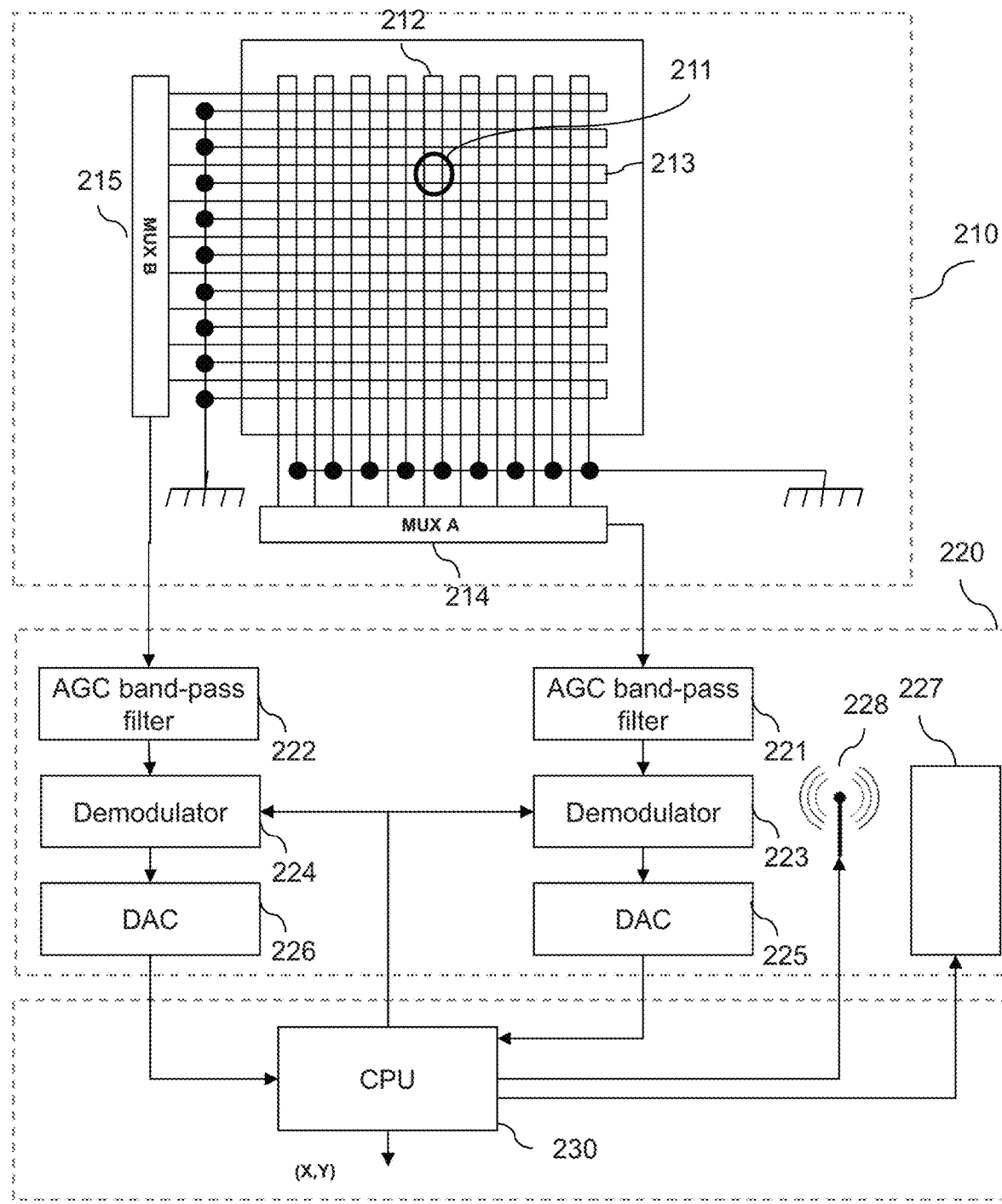
FIG. 2 illustrates an example of an interfacing device according to a particular embodiment.

In general terms, the invention is directed to determining the position (x-coordinate, y-coordinate and/or altitude) and/or the orientation (yaw, pitch and/or roll) of hybrid mobile entities used conjointly, and which are for example carried by a user (or a robot) capable of performing movements of large amplitude.

There are solutions for detecting the position and/or the orientation of a plurality of real objects, in particular when they are situated near or on a game board making it possible to use those objects as an interface for a computer system. For example, French patent No. 1057014 provides such a solution. Unfortunately, this solution only makes it possible to compute such position information items when those objects are in the detection field of a detection surface, for example at less than around ten centimeters from that detection surface.

In what follows, the detection range of a detector is defined as a zone limited in space, in which an electromagnetic field emitted by an emitter situated in that zone can be detected by a detector. Thus, when the emitter goes outside the detection range of the detector, the detector will not be able to detect an electromagnetic field emitted by the emitter.

Thus, a hybrid mobile entity carried by a user moving over a floor constituted for example by a set of detection surfaces (also called a smart floor) can, by the movements of the user (or of the robot), move substantially away from the detection surface and go beyond its detection range, such that the tracking of that hybrid mobile entity by the computer system cannot be continuous.

Also, when the detection surfaces only partially cover a building, for example, for cost reasons, there may be discontinuities in the position tracking of the hybrid mobile entity, in particular when the user (or the robot) carrying it enters a zone not covered by a detection surface.

In order to enable the tracking of such mobile entities, in particular when they are carried by one or more users (or robots) performing movements of large amplitude, the invention provides a hybrid mobile entity provided with at least one location module rigidly joined to an inertial measurement unit of which the autonomous operation makes it possible to obtain movement data, as well as means for communication (emitter-receiver) with the detection surface.

When such a hybrid mobile entity is outside the detection range of the detection surface, a position information item of its location module can nevertheless be obtained from movement data of the inertial measurement unit rigidly joined to the location module. Such a determination mode is called hybrid computation of the position information item, since it is based both on the movement data of the inertial measurement unit, but also on a position information item previously computed when the location module was within the detection range.

In the context of the present invention, several embodiments are envisioned for the hybrid computation.

According to a first embodiment, the hybrid computation is carried out at the location of the detection surface. In this embodiment, movement data measured by the inertial measurement unit are directly transmitted to the detection surface via the communication means. A new position information item is then computed by the detection surface from those movement data and from a position information item computed previously.

According to a second embodiment, the hybrid computation is carried out at the hybrid mobile entity. In this embodiment, the detection surface sends a previously computed position information item to the hybrid mobile entity. This position information item was typically computed from an electromagnetic signal received from the location module when it was within the detection range of the detection surface. This is for example the last position computed before the hybrid mobile entity leaves the range of the detection surface. The hybrid mobile entity then computes a new position information item using the received position information item and movement data measured by the inertial measurement unit. This hybrid position is then transmitted via the communication means provided on the hybrid mobile entity.

Thus, the movement data obtained by virtue of the autonomous operation of the inertial measurement unit enable the position tracking of the hybrid mobile entity, even when the location module that it incorporates momentarily leaves the detection range of the detection surface.

Furthermore, when the location module of a hybrid mobile entity is within the detection range of the detection surface, it is possible to compute position information items of the location module with some reliability, which makes it possible to adjust the movement data of the associated inertial measurement unit, for example with adjustment data based on those reliable position information items.

FIG. 1, composed of FIGS. 1*a* and 1*b*, is a diagram of a context in which embodiments of the invention can be implemented. The applications of the present invention are not limited to the example illustrated in that Figure. A hybrid mobile entity according to the invention may indeed equip any type of object (item of clothing that is worn, robot, gaming joystick, etc.).

In particular, FIGS. 1*a* and 1*b* represent the same scene but at two different times.

In this scene, a user of which only the shoes 102 and 103 are represented, is located on a floor entity 101 (or interfacing device) in accordance with embodiments of the invention. Even though, in this example, the interfacing device is a floor entity, the invention is not limited to interfacing devices located at floor level. In what follows, everything described with reference to the floor entity 101 may easily be transposed by the person skilled in the art to any interfacing device placed somewhere other than the floor, for example on side walls or on the ceiling.

The floor entity 101 comprises for example a hardware module as well as a detection surface as described with reference to FIG. 2. On account of its structure, this detection surface has a limited detection range, for example of the order of about ten centimeters.

The hardware module of the floor entity 101 comprises communication means (emitter-receiver), for example a wireless communication module of WiFi or Bluetooth type or for instance one that communicates in an ISM band (ISM standing for Industrial, Scientific and Medical) for example 2.4 GHz. These communication means enable the floor entity to interact with hybrid mobile entities in accordance with embodiments.

For example, these communication means may correspond to a radio emitter making it possible to activate a location module of a hybrid mobile entity, such as described with reference to FIG. 2, in order for it to emit an electromagnetic field useful for the computation of its position.

The hardware module of the floor entity 101 further comprises a computing module comprising a central processing unit. This processing unit for example controls the aforementioned communication means.

In this example, each shoe 102 (respectively 103) is equipped with a hybrid mobile entity 104 (respectively 105) in accordance with embodiments of the invention. Of course, the invention is not limited to two hybrid mobile entities and a much greater number of hybrid mobile entities may be handled by a same floor entity 101.

These hybrid mobile entities each comprise at least one location module as described with reference to FIGS. 5 and 6.

According to particular embodiments of the present invention, the hybrid mobile entities 104 and 105 comprise in addition an inertial measurement unit rigidly joined to each location module. Thus, an inertial measurement unit is fixed relative to the associated location module.

Such an inertial measurement unit for example comprises one or more accelerometers, one or more magnetometers and/or one or more rate gyros. Thus, an inertial measurement unit makes it possible to obtain movement data for example such as a speed of rotation at a particular time around a certain axis, an acceleration at a particular time according to a certain axis, or for instance an estimation of the direction of the magnetic field at a particular time.

Still according to particular embodiments of the present invention, the hybrid mobile entities 104 and 105 respectively comprise wireless communication means (not shown) of WiFi or Bluetooth type or for instance that communicate in an ISM band (ISM standing for Industrial, Scientific and Medical) for example 2.4 GHz. These communication means enable the hybrid mobile entities to interact with the corresponding communication means of the floor entity 101.

For example, these communication means may correspond to an activation-command-detecting radio emitter-receiver, as described with reference to FIG. 6.

As a variant, separate means may be used. For example the inertial measurement unit may comprise these communication means.

When the shoes 102 and 103 of the user are placed on the floor entity 101, as represented in FIG. 1a, the hybrid mobile entities 104 and 105 which they carry are within the detection range of the floor entity 101.

It is thus possible to sequentially activate the location modules of the hybrid mobile entities 104 and 105 and to determine their respective position by implementing a computing step based on the signals (magnetic fields) received from those location modules, as described with reference to FIG. 3.

On the other hand, when the user moves one of her shoes, for example the shoe 102, as represented in FIG. 1b, the hybrid mobile entity 104 carried by it may leave the detection range of the floor entity 101.

When the hybrid mobile entity leaves the detection range of the floor entity as is the case in FIG. 1b, the latter cannot receive signal (magnetic field) emitted by the activated location module and thus cannot determine the position of that module based on it.

Other situations exist in which the hybrid mobile entity leaves the detection range, for example when a part is equipped with one or more floor entities (smart floor) such as the floor entity 101, covering the surface of the floor discontinuously. Thus, when a user is located on a surface not provided with a floor entity, the hybrid mobile entity that she carries may practically always be located outside the range of the floor entities equipping the room.

However, the hybrid mobile entity advantageously enables the floor entity 101 not to lose the tracking of the position of that hybrid mobile entity when such situations occur.

As a matter of fact, as mentioned above, the hybrid mobile entity comprises an inertial measurement unit rigidly joined to the location module, such that the movement of that location module can be measured autonomously by the inertial measurement unit.

The communication means of the hybrid mobile entity are not dependent on the detection range of the floor entity 101, which makes it possible to transmit movement data from the inertial measurement unit, to the floor entity 101 by that means when the hybrid mobile entity is out of range.

On the basis of these received data, the floor entity 101 can compute the position of the hybrid mobile entity of which it was not possible to receive the electromagnetic signal emitted by the activated location module, by implementing a hybrid computation step based on the received data, as described with reference to FIG. 4.

As a variant, the communication means of the hybrid mobile entity make it possible to receive, from the floor entity, a position information item previously computed from a signal emitted by the location module at a time at which it was within the detection range of the floor entity.

From this position information item and from the movement data of the inertial measurement unit, the hybrid mobile entity computes the position of the associated location module, by implementing a hybrid computation step based on the received data, as described with reference to FIG. 4.

FIG. 2 illustrates an example of an interfacing device according to a particular embodiment.

The floor entity or interfacing device comprises a detection surface 210 here constituted by a mesh in the form of rows and columns constituting a conductive grid. The latter comprises a set of conductive loops along two orthogonal axes. Each loop is a sensor making it possible to measure the intensity of the current or the voltage induced by a solenoid (belonging to a hybrid mobile entity of which the position and/or the orientation are to be computed) which is positioned on the detection surface.

Advantageously, the detection surface may be a surface of PET plastic on which the conductive grid has been formed by silver screen-printing. For example, the conductive grid has been formed by printing using a conductive ink jet containing particles of silver. As a variant, the detection surface is for example a surface of PET plastic on which the conductive grid has been formed by copper tracks. According to another possibility, the conductive grid is formed by weaving with a conductive wire.

As a variant, the detection surface may be a PCB type board (PCB standing for Printed Circuit Board) for electromagnetic reception, which may be flexible or rigid.

By way of illustration, it is assumed here that a solenoid is placed in position 211, that is to say at the intersection of the loops 212 and 213 of which one end is connected to a ground and the other end is connected to the electronic components used to compute a position. When the solenoid situated at position 211 is powered, it generates an inductive current in the loops 212 and 213 which may be analyzed and compared with the current induced in the other loops. It is thus possible, by inductive coupling between the solenoid and the grid and by measurement of the induced current, to determine the solenoid position.

Multiplexers 214 and 215 are connected to each loop of each of the two axes of the grid, that is to say here to each of the vertical and horizontal loops, respectively. The outputs from the multiplexers 214 and 215 are connected to the automatic gain controllers (AGCs) 221 and 222, respectively, at a module 220 of the hardware module of the floor entity 101.

The output signals from the automatic gain controllers 221 and 222 are first of all demodulated in the demodulators 223 and 224, respectively. The demodulation produces a direct current (or DC) signal proportional to the original sinusoid made up with alternating current (or AC) components that are multiples of the fixed frequency emitted by the solenoid.

According to a commonly used configuration, the computing module, here referenced 230, of the hardware module of the floor entity 101, drives the multiplexers 214 and 215 in order to sequentially activate the loops, that is to say to activate a loop n+1 after a loop n. When the last loop has been reached, the processor initiates a new cycle and drives the activation of the first loop.

A band-pass filter is advantageously employed in each automatic gain controller 221 and 222 to eliminate the undesirable harmonics from the signal as well as the electromagnetic background noise. This filtering makes it possible to refine the measurements of the signals coming from the multiplexers 214 and 215, which are demodulated in the demodulators 223 and 224 then digitized in the digital/analog converters (DACs) 225 and 226, respectively.

The digital values obtained are sent to the central processing unit (CPU) 230 of the computing module to be stored in memory. As illustrated, the central processing unit 230 controls the demodulators 223 and 224.

After the values have been stored in memory, the central processing unit increments the address of the multiplexers in order to carry out the digitization of the signals coming from the following loops. When a last loop has been attained, the central processing unit reinitializes the address of the multiplexer corresponding to the value of the first loop of the axis considered.

At the end of a cycle, the central processing unit has stored in memory, for each axis, the same number of digital values as there are adjacent loops close to the position of the solenoid. Based on these values, the central processing unit computes the position of the solenoid by interpolation as described below.

It is to be noted here that the ground connection of the loops may be provided by strips of metal positioned between the different loops in order to protect them from electromagnetic interference. An alternative consists of disposing a uniform ground plane under the conductive grid.

Furthermore, the module 210 here comprises a radio emitter 227, controlled by the central processing unit 230 of the computing module, enabling a location module of a hybrid mobile entity to be activated. By way of illustration, the central processing unit 230 sends to the radio emitter 227 an identifier of a location module to activate. This identifier is coded then sent in the form of a digital or analog radio signal. Each location module receiving this signal may then compare the identifier received with its own identifier and activate itself if the identifiers are identical.

The module 220 further comprises communication means 228, which are for example similar to the radio emitter 227. These communication means make it possible to communicate with the hybrid mobile entities in order to obtain movement data of inertial measurement units rigidly joined to location modules, that are particularly useful when the activated location module is beyond the detection range of module 210. These communication means also enable the central processing unit 230 to send a given hybrid mobile entity a position information item computed previously by virtue of the signal emitted by the location module which it integrates, or for instance to send adjustment data for adjusting the movement data of the inertial measurement unit. As a variant, the communication means 228 may be combined with the entity 227.

Modules 220 and 230 make it possible to compute in real time a hybrid position such as described above.

Thus, to estimate the position of a set of location modules, it is necessary to perform a cycle on each location module and, for each of those cycles, according to the embodiment described here, one cycle on each set of loops.

Several detection surfaces may be combined with each other, the resulting area of the detection surface being the sum of the areas of the detection surfaces combined. For these purposes, one detection surface is considered as master, the others being considered as slaves. The sequential activation of the mobile entities is managed by the master detection surface which preferably receives the positions computed by the hardware modules associated with each slave detection surface and consolidates them by producing a table containing the coordinates and angles of freedom of the location modules.

Figure 3A:
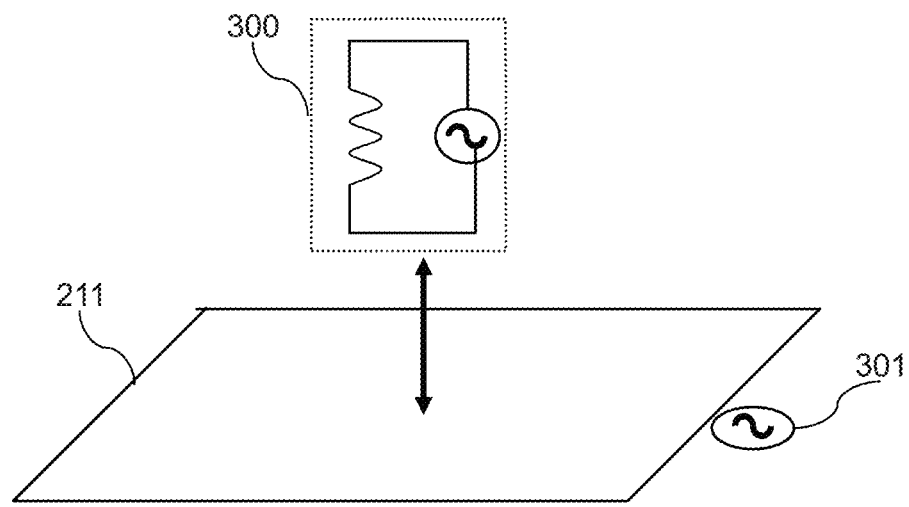
FIG. 3, composed of FIGS. 3a and 3b, is a diagram of the physical principle of inductive coupling between a solenoid and a conductive loop of a detection surface (FIG. 3a), as well as of an interpolation mechanism (FIG. 3b) making it possible to determine the position of a solenoid placed on a detection surface, along a given axis, on the basis of the measurements obtained by a system such as that described with reference to FIG. 2.
Figure 3B:
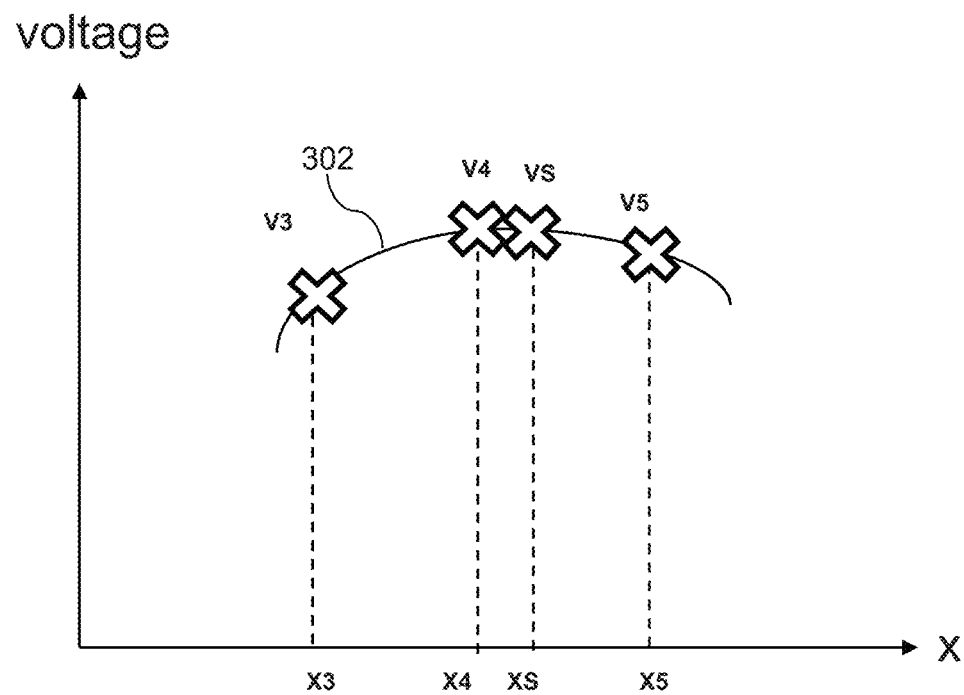

FIG. 3 is composed of FIGS. 3a and 3b.

FIG. 3a diagrammatically illustrates the physical principle of inductive coupling between a solenoid and a conductive loop of a detection surface.

Each hybrid mobile entity of which the position and/or the orientation are to be computed comprises at least one solenoid of which the axis is, preferably, oriented towards the detection surface.

The solenoid 300 is passed through by an alternating current and emits an electromagnetic field which propagates towards the detection surface, in particular, in this example, towards the loop 211. The loop 211, receiving an electromagnetic field coming from the solenoid 300, couples with the solenoid 300. It is then possible to measure an alternating current signal at the terminals of that loop, referenced 301.

The coupling between the solenoid 300 and the loop 211 may be expressed in the form of the following relationship, $$R = \frac{k}{D^2} E$$

wherein E designates the voltage at the terminals of the solenoid 300, R designates the voltage of the signal received at the terminals 301 of the receiving loop 211, D is the distance between the solenoid 300 and the receiving loop 211 and k is a constant linked to intrinsic factors of the system comprising the solenoid and the receiving loop, in particular the number of turns of the solenoid and the size of the loop.

FIG. 3b diagrammatically illustrates an interpolation mechanism making it possible to determine the position of a solenoid placed on a detection surface, according to a given axis, based on the measurements obtained by a system such as that described with reference to FIG. 2. This mechanism may be implemented in step 403 (FIG. 4) of computing the position of the hybrid mobile entity from the signal (electromagnetic field) received from its location module.

It is assumed here that the solenoid is situated in the vicinity of vertical loops B3, B4 and B5, positioned according to the x-coordinates X3, X4 and X5, the voltages measured at the terminals of the loops being denoted V3, V4 and V5, respectively. The solenoid is to be found here at a position, along the x-axis, denoted XS.

The coordinates X3, X4 and X5 may be obtained by the central processing unit of the floor entity (or interfacing device) from an identifier of the corresponding loop (these values are predefined according to the routing diagram of the detection surface and, preferably, are stored in a non-volatile memory).

The portion of curve 302 represented in FIG. 3b illustrates the variation in voltage for the position XS of the solenoid according to the positions of the loops coupled with the solenoid, extrapolated from the values measured by the loops B3, B4 and B5. It may be assimilated to a quadratic function of parabolic type. This local approximation corresponds, in practice, to the phenomenon of electromagnetic coupling between a solenoid and loops of a conductive grid. The following relationships illustrate this property:

$$V3 = a(X3-XS)^2 + b$$

$$V4 = a(X4-XS)^2 + b$$

$$V5 = a(X5-XS)^2 + b$$

in which a and b are constants, a being a constant less than zero (a<0).

Furthermore, given the assumption of a quadratic function, the relationships between the x-coordinates X3, X4 and X5 may be expressed in the following form:

$$X4 - X3 = X5 - X4 = \Delta X$$

$$X5 - X3 = 2\Delta X$$

$\Delta X$ representing the distance between the x-coordinates X3 and X4 and between the x-coordinates X4 and X5.

It is thus possible to interpolate the position of the solenoid according to the following formula:

$$XS = X3 + \frac{\Delta X}{2} \frac{3V3 - 4V4 + V5}{V3 - 2V4 + V5}$$

It is also possible, according to the same logic, to determine the position of the solenoid according to the y-axis.

Furthermore, the distance between the solenoid and the loop (that is to say the altitude of the solenoid relative to the detection surface) may be defined according to the following relationship:

$$D = \sqrt{\frac{k}{R}E}$$

The distance D is thus a function of the value R representing the voltage at the terminals of the loops considered of the detection surface. It may be extrapolated from the measurements made. It is to be noted that the accuracy of this distance computation is in particular linked to the stability of the signal E emitted by the solenoid of which the value must be as constant as possible over time, which requires a stabilized supply in the location module which must not drop as the battery discharges. This may be ensured by a voltage regulator of the location module.

Figure 4A:
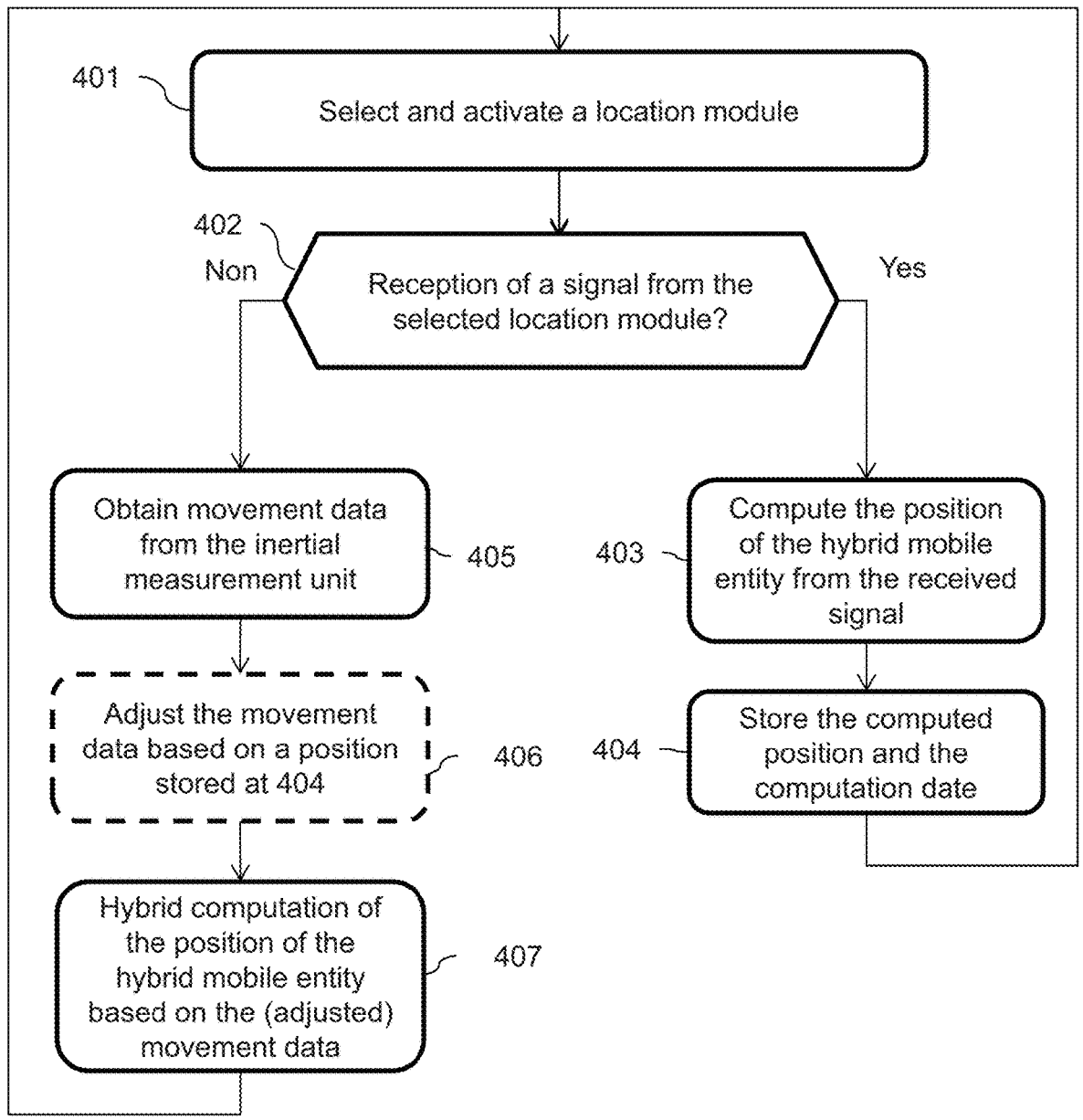
FIGS. 4*a* and 4*b* are flowcharts representing steps implemented respectively by a device (FIG. 4*a*) and a hybrid mobile entity (FIG. 4*b*) according to a first embodiment of the invention.
Figure 4B:
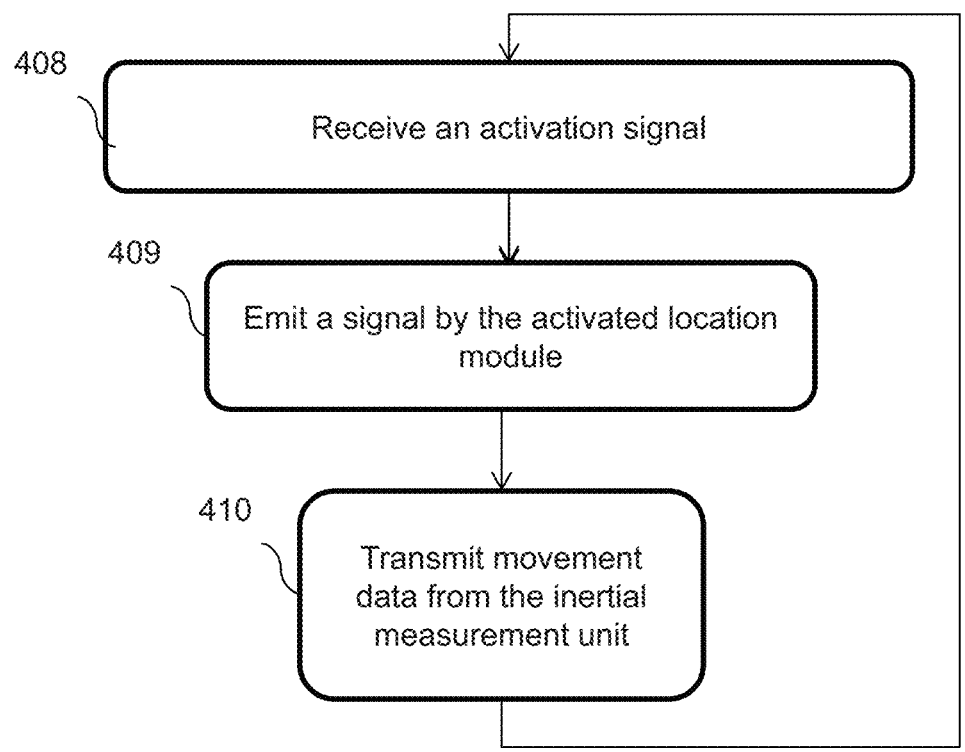

FIGS. 4a and 4b are flowcharts representing steps implemented respectively by an interfacing device (FIG. 4a) and a hybrid mobile entity (FIG. 4b) according to a first embodiment of the invention.

FIGS. 4a and 4b illustrate a first example algorithm able to be used to compute the positions and/or orientations of hybrid mobile entities.

In this first example, the hybrid computation of the position in case of failure in reception of an electromagnetic signal coming from the selected location module (that is to say in the absence of reception of an electromagnetic signal at the time of activation of the location module) is implemented in the interfacing device, for example by a central processing unit of the floor entity 101 represented in FIG. 1.

A description is given here of the steps implemented by the interfacing device according to this first embodiment with reference to FIG. 4a.

During a first step 401, a location module integrated into a hybrid mobile entity is selected and activated by the interfacing device.

In practice, the interfacing device selects a location module identifier from among a plurality of identifiers.

By way of illustration, the central processing unit 230 of the interfacing device sends to the radio emitter 227 of the interfacing device an identifier of a location module to activate. This identifier is coded in order to be transmitted to all the location modules in the form of a digital or analog activation signal. Each location module receiving this signal may then compare the identifier received with its own identifier and activate itself if the identifiers are identical. This activation for example consists of powering the solenoid 300 of the selected location module in order for it to emit an electromagnetic field.

During a step 402, a test is carried out to know whether a signal coming from the selected module has been received.

In practice, when a location module is selected and activated as described above, it emits a signal, for example an electromagnetic field, intended for the interfacing device, in particular its detection surface 210.

However, when the location module emits this electromagnetic field while it is outside the detection range of the detection surface 210 of the interfacing device, this cannot detect the emitted electromagnetic field and cannot therefore compute the position from it. Step 402 consists of detecting such a situation.

When the electromagnetic field emitted by the activated location module has been detected during step 402, this means that this is within the detection range of the detection surface 210 of the interfacing device.

A position information item can then be computed at step 403, from the received electromagnetic field, for example by interpolation as described with reference to FIG. 3b.

This position information item is then stored in association with the date of its computation in a memory of the interfacing device (step 404). As will be explained in more detail below, this position information item as well as the associated date will be used to adjust movement data provided by the inertial measurement unit of the selected hybrid mobile entity, prior to or during the hybrid computation of a new position information item at a time when the computation of the position information item according to step 403 is not possible.

When an electromagnetic field is not detected by the detection surface 210 of the interfacing device during step 402, this means that the selected location module is outside the range of the detection surface 210.

In this case, movement data of an inertial measurement unit rigidly joined to the selected location module are obtained (step 405). In practice, these movement data are dated and are received via the communication means 228 (which may be combined with the HF emitter-receiver 227) of the interfacing device. For example, these movement data are obtained on request of the interfacing device. As a variant, the hybrid mobile entity can regularly transmit movement data to the interfacing device, for example every second or 100 times per second, according to the intended application (for example augmented or virtual reality).

As mentioned previously, the movement data of the location module measured by the inertial measurement unit rigidly joined to that location module for example comprise:
  one or more rotation speeds at a particular time provided by a rate gyro;
  one or more accelerations at a particular time provided by an accelerometer;
  one or more estimations of the direction of the magnetic field at a particular time provided by a magnetometer.

This list is not limiting. These movement data may be obtained by different sensors.

During an optional step 406, the movement data obtained at step 405 are processed so as to correct a possible temporal drift or the effect of a shock suffered by the inertial measurement unit. This processing, termed "adjustment", is based on one or more positions computed during step 403 on the basis of an electromagnetic signal emitted at an earlier time by the location module selected when it was within the range of the detection surface 210. As mentioned previously, such a position is stored in memory with its computation date (step 404). The knowledge of the computation date and the value of the position at that specific time makes it possible to adjust the data of the inertial measurement unit, themselves having a date.

By way of illustration, the interfacing date may, based on successive computation of the position of a same location module, track the change over time in its position and thus identify the times at which that location module has zero velocity characterizing a contact without sliding. These particular times (of contact without sliding) make it possible to adjust the contact computed from the movement data of the inertial measurement unit, for example by reinitializing the estimated velocity to zero.

It will be noted that a hybrid mobile entity comprising two location modules already makes it possible to correct the drift in the movement data of the inertial measurement unit about the vertical axis of the hybrid mobile entity.

During a step 407, the interfacing device performs a hybrid computation of a new position information item of the selected location module. This particular computation is qualified as hybrid since it uses the movement data of the inertial measurement unit obtained at step 405, which may be adjusted (if need be) at step 406, and also uses one or more items of position information computed previously when the selected location module was within the detection range (i.e. according to a step 403).

The person skilled in the art understands that the hybrid computation (step 407) takes into account the date of the movement data and that of the earlier position information item, stored in advance at step 404.

Indeed, in order to enable the hybrid computation to be consistent, the movement data received from the hybrid mobile entity and the position information items computed by the interfacing device are synchronized.

For this, the interfacing device may send a tick at a regular cadence, indicating what time (in its local clock) that tick corresponds to. Thus the hybrid mobile entity is capable of determining the date of the data it sends, in particular movement data of the inertial measurement unit, expressed in the local clock of the interfacing device.

As a variant, it is possible to use a tick counter on the interfacing device and to attribute a tick number to the received movement data.

According to another possibility, a clock synchronization protocol may be used, for example the NTP protocol (NTP standing for Network Time Protocol) to synchronize the clocks of the hybrid mobile entity and of the interfacing device.

Thus, in the absence of an electromagnetic field emitted by the solenoid of the selected location module, the hybrid computation 407 makes it possible to determine an instantaneous position information item, from an old position information item and movement data.

By way of illustration, let us suppose the movement data comprise the movement velocity V(T1) of the location module. Thus, the hybrid computation of the position P(T1) of the movement module at time T1 may be carried out by application of the following formula:

$$P(T1)=P(T0)+V(T1)\cdot(T1-T0)$$

Wherein P(T1) is the position of the location module computed at time T1, P(T0) is the position of the location module computed at time T0 (prior to T1), V(T1) is the velocity of the location module at time T1.

This example is not limiting and more complex computations, for example comprising one or more integrations over time may be implemented.

In particular, such a hybrid computation possibly comprising the aforementioned adjustment, may for example be based on hybridization algorithms well known to the person skilled in the art, such as the Kalman filter, extended Kalman filter or complementary filters.

Thus, the invention enables a position information item of an activated location module to be obtained in real time (step 403 or step 407), whether or not the hybrid mobile entity is within the detection range of the detection surface, this being based on two types of data: the movement data of the inertial measurement unit rigidly joined to the location module, and the electromagnetic signals emitted by it when it is within the detection range of the detection surface.

Advantageously, the combination of the inertial measurement unit with the location module, constituting different systems with complementary characteristics, enables the insufficiencies of each of them to be mitigated. For example, the computation of the position of the location module based on electromagnetic signals that it emits (step 403), is accurate and does not suffer any problem of drift over time, but the computation is subject to the limited detection range of the detection surface 210.

As regards the inertial measurement unit this constitutes another positioning means based on different physical principles, i.e. inertia, of which the measurements are autonomous and reliable. The problems of drift over time or the effect of shocks suffered by the inertial measurement unit may be solved by the use of old positions computed during steps 403.

Correspondingly, and as represented in FIG. 4b, the hybrid mobile entity receives an activation signal (step 408) sent by the interfacing device at step 401.

Figure 6:
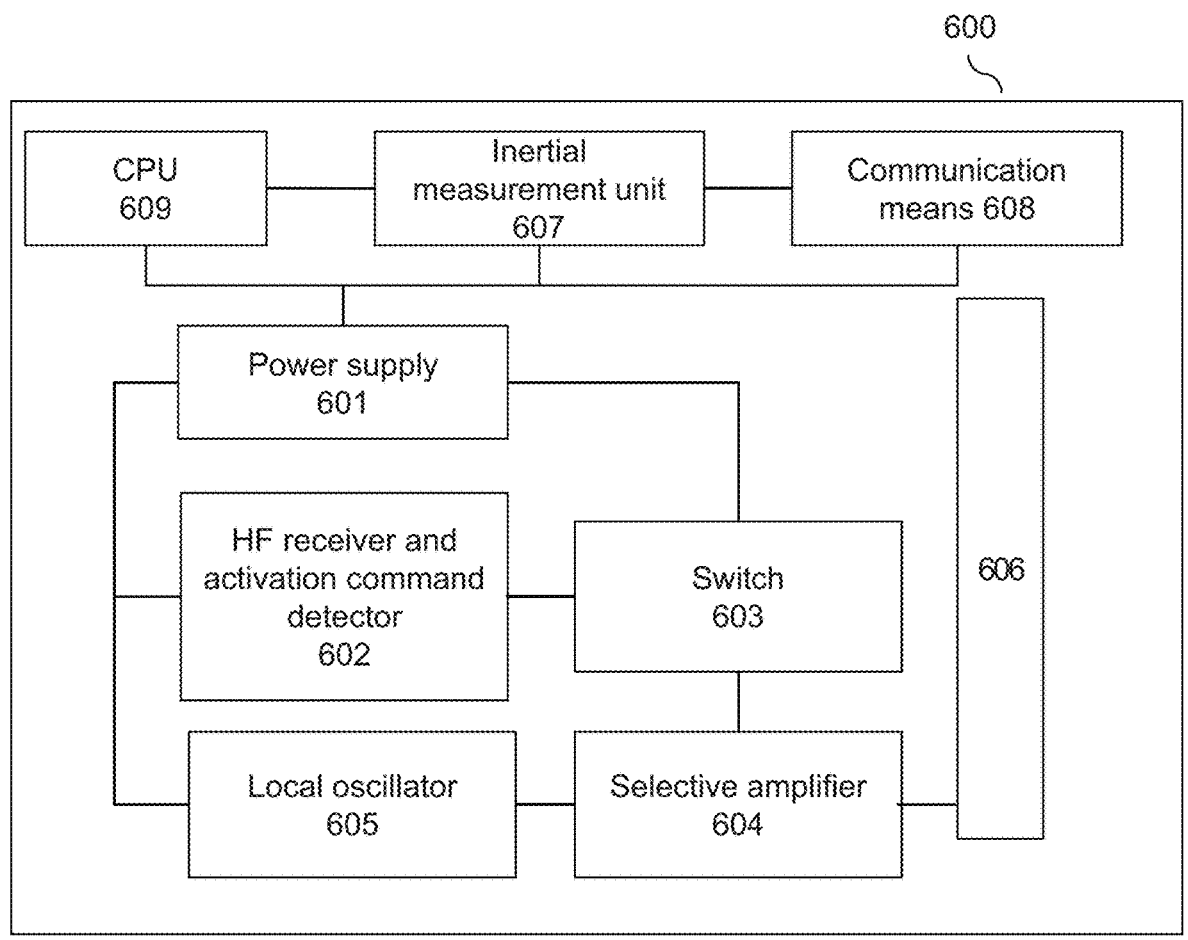
FIG. 6 is a diagram of the logic blocks of a hybrid mobile entity of which the position may be determined from an interfacing device as illustrated in FIG. 2.

By way of illustration, the HF receiver and activation command detector 602 of the hybrid mobile entity represented in FIG. 6 receives an activation command comprising a location module identifier in coded form. The hybrid mobile entity receiving this signal can then compare the identifier received with the identifier of its location module or modules and activate the latter if the identifiers are identical. This activation for example consists of powering the solenoid 300 of the selected location module in order for it to emit an electromagnetic field.

During a step 409, the location module so activated emits a signal, for example an electromagnetic field. However, even if such a signal is emitted, it is not necessarily received by the interfacing device. In particular, if the location module is outside the range of the detection surface 210, the electromagnetic signal is emitted by is not perceived by the detection surface 210.

During a step 410, the hybrid mobile entity transmits movement data from the inertial measurement unit, which are received by the interfacing device during step 405.

In practice, as represented in FIG. 6, these movement data are generated by sensors of the inertial measurement unit 607 and are retrieved (and dated) by the processing unit 609 of the hybrid mobile entity in order to be sent via a communication system 608 (which is possibly combined with the emitter-receiver 602). The date potentially attributed to the movement data is directed to enabling the synchronization of these latter with the positions stored in the interfacing device at step 404. As mentioned earlier, this synchronization is enabled either by dating the movement data at the hybrid entity, in the clock of the interfacing device prior to sending (sending of ticks of regular cadence and corresponding dates in the reference frame of the interfacing device clock, use of clock synchronization protocol for example NTP), or at the interfacing device (tick counter).

This step 410 may be performed on request of the interfacing device or else be performed regularly, for example every second or 100 times per second, according to the application envisioned (for example augmented or virtual reality).

Figure 4C:
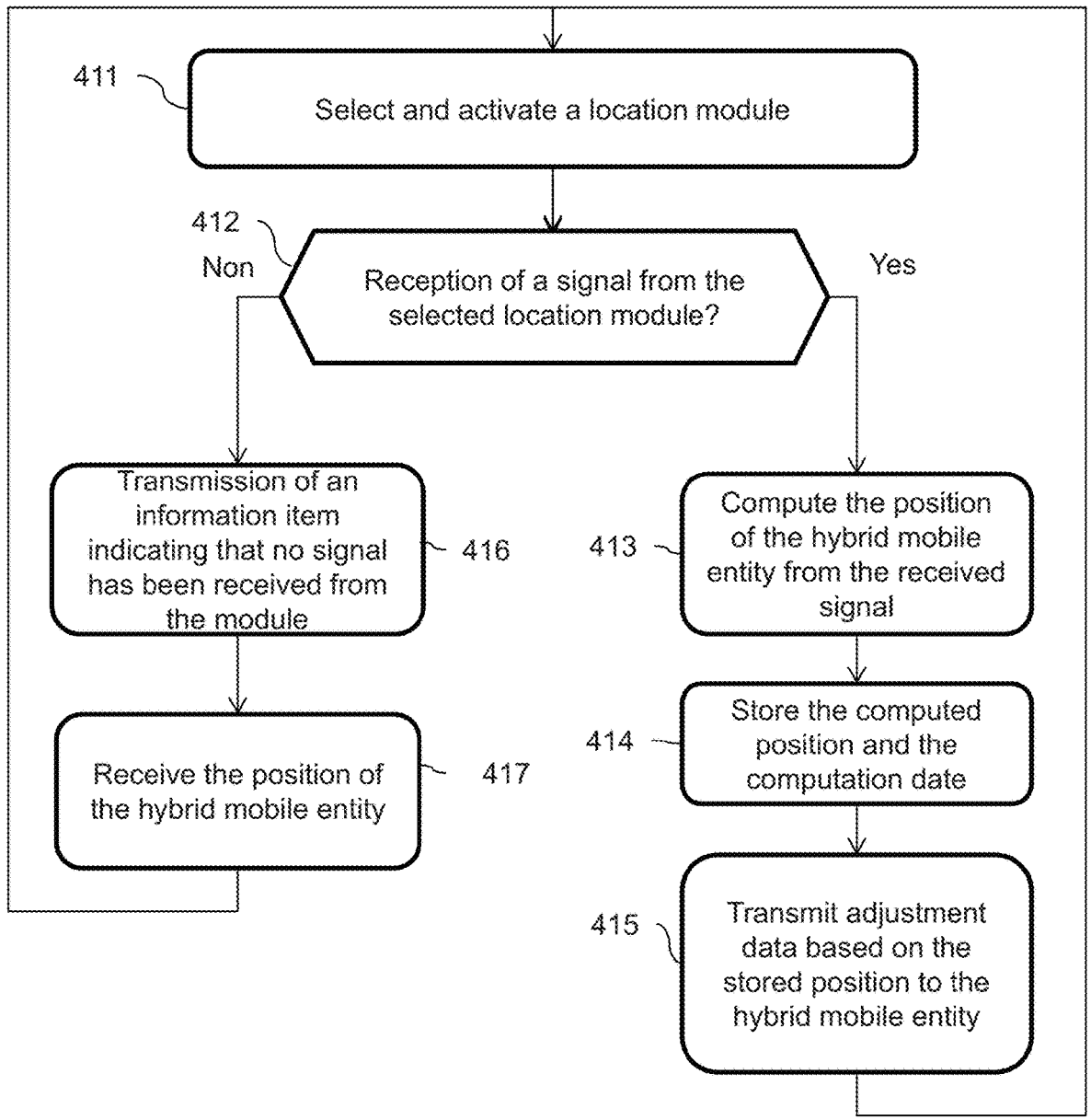
FIGS. 4*c* and 4*d* are flowcharts representing steps implemented respectively by a device (FIG. 4*c*) and a hybrid mobile entity (FIG. 4*d*) according to a second embodiment of the invention.
Figure 4D:
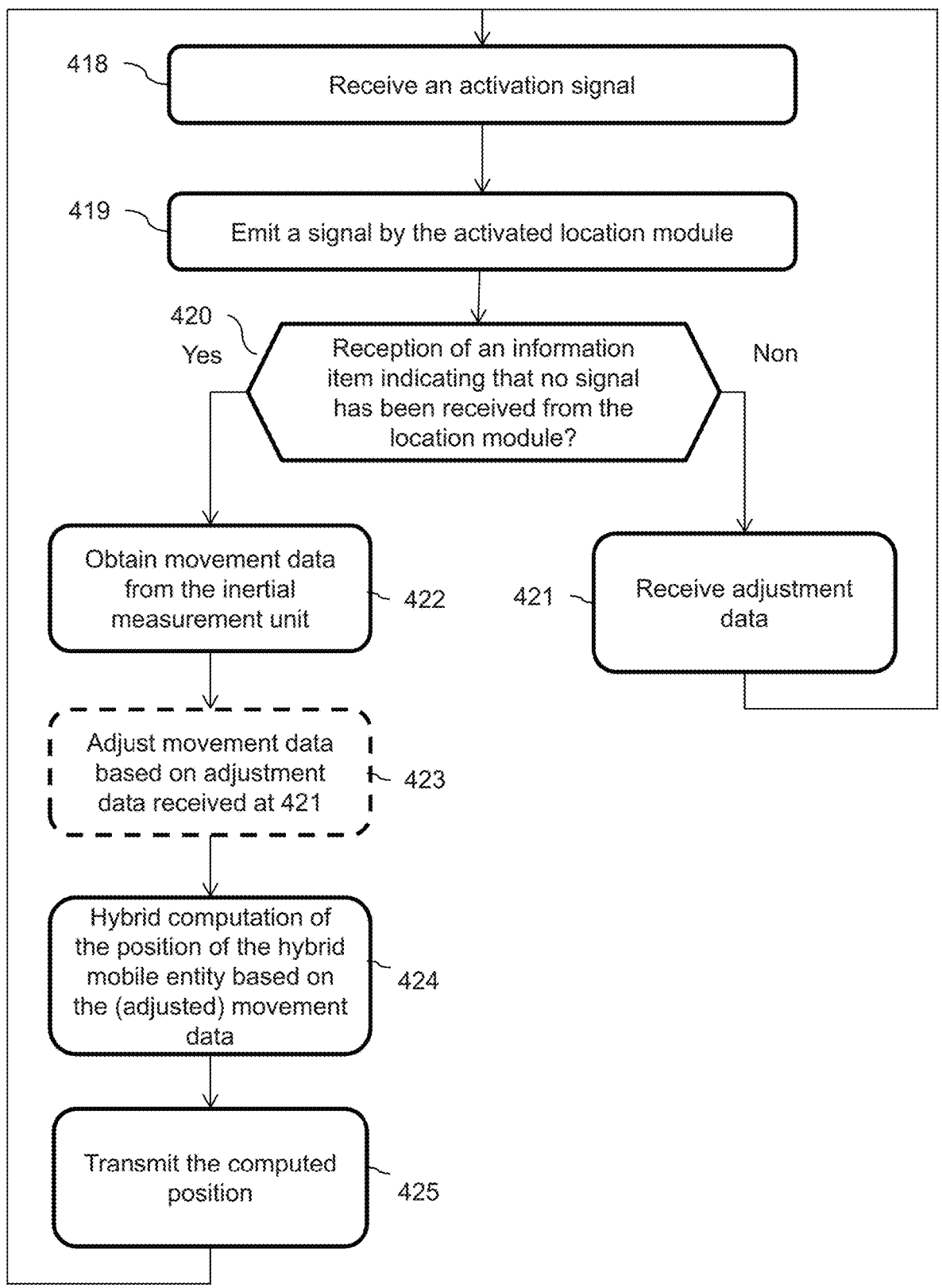

FIGS. 4c and 4d are flowcharts representing steps implemented respectively by an interfacing device (FIG. 4c) and a hybrid mobile entity (FIG. 4d) according to a second embodiment of the invention.

FIGS. 4c and 4d illustrate a second example algorithm able to be used to compute the positions and/or orientations of hybrid mobile entities.

In this second example, the hybrid computation of the position in case of reception failure of an electromagnetic signal coming from the selected location module (that is to say in the absence of reception of an electromagnetic signal on activation of the location module) is implemented in the selected hybrid mobile entity and activated by an interfacing device, for example by the processing unit 609 represented in FIG. 6 and given the task of the processing of the data coming from the inertial measurement unit or from the associated location module.

A description is given here of the steps implemented by the interfacing device according to this second embodiment with reference to FIG. 4c.

During a first step 411, similar to step 401 of FIG. 4a, a location module integrated into a hybrid mobile entity is selected and activated by the interfacing device.

During a step 412, similar to step 402, of FIG. 4a, a test is carried out to know whether a signal coming from the selected module has been received.

In practice, when a location module is selected and activated as described above, it emits a signal, for example an electromagnetic field, intended for the interfacing device, in particular its detection surface 210.

However, when the location module emits this electromagnetic field while it is outside the detection range of the detection surface 210 of the interfacing device, this cannot detect the emitted electromagnetic field and cannot therefore compute the position from it. Step 412 consists of detecting such a situation.

When the electromagnetic field emitted by the activated location module has been detected during step 412, this means that this is within the detection range of the detection surface 210 of the interfacing device.

A position information item can then be computed at step 413, similar to step 403 of FIG. 4a, from the received electromagnetic field, for example by interpolation as described with reference to FIG. 3b.

This position information item is then stored in association with the date of its computation in a memory of the interfacing device (step 414 similar to step 404 of FIG. 4a).

As will be explained in more detail below, this position information item as well as the associated date will be used by the hybrid mobile entity to adjust movement data provided by the inertial measurement unit, prior to or during the hybrid computation of a new position information item at a time at which the computation of the position information item by the interfacing device according to step 413 is not possible.

For this, the interfacing device transmits adjustment data based on the position computed at step 413 and stored with its date at step 414. According to a particular embodiment, these adjustment data directly comprise this position as well as its date. According to another particular embodiment, the adjustment data may for example comprise an instruction for reinitializing sensors of the inertial measurement unit, such that the next movement data measured by it will represent a movement of the location module relative to its position as computed at step 413. The adjustment data may as a variant comprise other information based on one or more positions computed by the interfacing device, for example a speed or an acceleration at a given time.

When an electromagnetic field is not detected by the detection surface 210 of the interfacing device during step 412, this means that the selected location module is outside the range of the detection surface 210.

In this case, the interfacing device notifies this to the hybrid mobile entity comprising the corresponding location module, during a step 416. In practice, this information is sent via the communication means 228 (possibly combined with HF the emitter-receiver 227) controlled by the processing unit 230 of the interfacing device.

This information may be directly the last position computed by the interfacing device from an electromagnetic signal.

It is to be noted that in some embodiments in which the adjustment data sent at step 415 directly comprise the position or enable that position to be deduced, the hybrid mobile entity already possesses that position information item. Thus, the information item sent at step 416 may simply consist of an instruction for triggering the hybrid computation.

During a step 417, the interfacing device receives the position of the hybrid mobile entity, which, in this embodiment, is computed by the hybrid mobile entity, as will be described in more detail with reference to FIG. 4*d* which represents the steps implemented on the hybrid mobile entity in this second embodiment.

Thus, the invention enables a position information item of an activated location module to be obtained in real time (step 413 or step 417), whether or not the hybrid mobile entity is within the detection range of the detection surface, this being based on two types of data: the movement data of the inertial measurement unit rigidly joined to the location module, and the electromagnetic signals emitted by it when it is within the detection range of the detection surface.

Correspondingly, and as represented in FIG. 4*d*, the hybrid mobile entity receives an activation signal (step 418, similar to step 408 of FIG. 4*b*) sent by the interfacing device at step 411.

During a step 419, similar to step 409 of FIG. 4*b* the location module thus activated emits a signal, for example an electromagnetic field. It is to be recalled that even if such a signal is emitted, it is not necessarily received by the interfacing device. In particular, if the location module is outside the range of the detection surface 210, the electromagnetic signal is emitted by is not perceived by the detection surface 210.

During a step 420, a test is carried out to know whether an information item coming from the interfacing device has been received, indicating that it has not received the expected electromagnetic signal. As explained earlier, this situation arises when the location module emitting that signal at step 419 is situated outside the range of the detection surface 210.

When no information of this type has been received after a certain predetermined time, for example equal to the time between two clock ticks of the hybrid mobile entity, this means that the electromagnetic signal emitted by the location module at step 419 has indeed been received (this is then situated within the range of the detection surface 210) by the interfacing device and that a position information item may be computed by it from that signal (step 413 de la FIG. 4*c*).

During a step 421, the hybrid mobile entity receives adjustment data sent by the interfacing device (step 415 of FIG. 4*c*). It is to be recalled that these adjustment data are computed by the interfacing device from the computed position by virtue of the electromagnetic signal received from the activated location module.

When on the contrary the hybrid mobile entity receives an information item indicating that no signal has been received from the activated location module, this means that the electromagnetic signal emitted by the location module at step 419 has not reached the detection surface 210 and that the location module is situated outside the range of the detection surface 210.

In this case, the hybrid mobile entity retrieves the movement data from the inertial measurement unit as well as their date (step 422), for example in a memory associated therewith. In practice, as represented in FIG. 6, it is this processing unit 609 which obtained the movement data of the inertial measurement unit 607.

During a step 423, similar to step 406 of FIG. 4*a* except that it is based on the adjustment data received at 421, the movement data obtained at step 422 are processed by the hybrid mobile entity so as to correct a possible temporal drift or the effect of a shock suffered by the inertial measurement unit.

This adjustment processing is based on one or more positions computed by the interfacing device on the basis of an electromagnetic signal emitted at an earlier time by the location module selected when it was within the range of the detection surface 210. As mentioned earlier, such a position is typically received in the form of adjustment data with the date associated. According to a variant embodiment, a position computed by the interfacing device may be received as an information item at 420. The knowledge of the date of the computation of the position received and of the value of the position at that precise moment makes it possible to adjust the data of the inertial measurement unit, which are themselves dated, as explained with reference to step 406 of FIG. 4*a*.

During a step 424, similar to step 407 of FIG. 4*a*, the hybrid mobile entity performs a hybrid computation of a new position information item of the selected location module. It is to be recalled that this particular computation is qualified as hybrid since it uses the movement data of the inertial measurement unit adjusted at step 423, and also uses one or more position information items computed previously (for example received as adjustment data at step 421) by the interfacing device when the selected location module was within detection range (i.e. in accordance with a step 413 of FIG. 4*c*). Details on the hybrid computation have been previously given with reference to step 407 of FIG. 4*a* (first embodiment), and will not be repeated here.

It is however to be recalled that such a hybrid computation (as well as the adjustment) may for example be based on hybridization algorithms well known to the person skilled in the art, such as the Kalman filter, extended Kalman filter or complementary filters.

Thus, in this second embodiment too, in the absence of an electromagnetic field emitted by the selected location module, the hybrid computation 424 makes it possible to determine an instantaneous position information item, from an old position information item and movement data.

Lastly, the hybrid mobile entity transmits the position thus computed to the interfacing device during a step 425. Thus, the interfacing device obtains a position information item although it has not been able to compute it itself in the absence of detection of the electromagnetic field emitted by the location module.

Figure 5A:
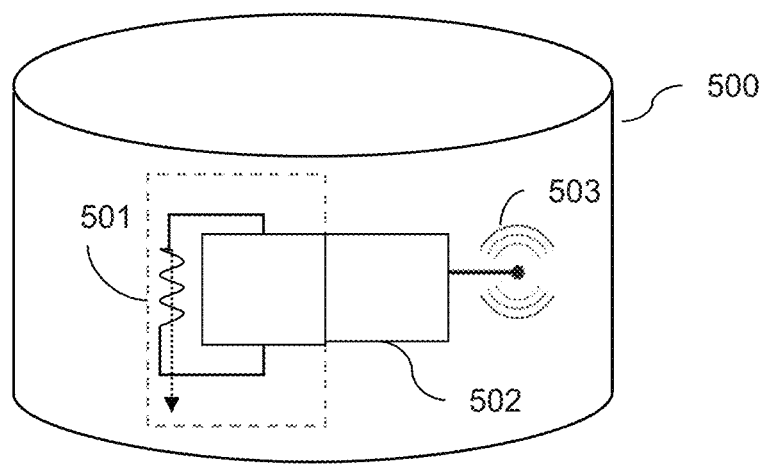
FIGS. 5*a* and 5*b* are diagrams of two examples of hybrid mobile entities of which the position may be determined and of which the position and the orientation may be determined, respectively, in accordance with particular embodiments of the invention.
Figure 5B:
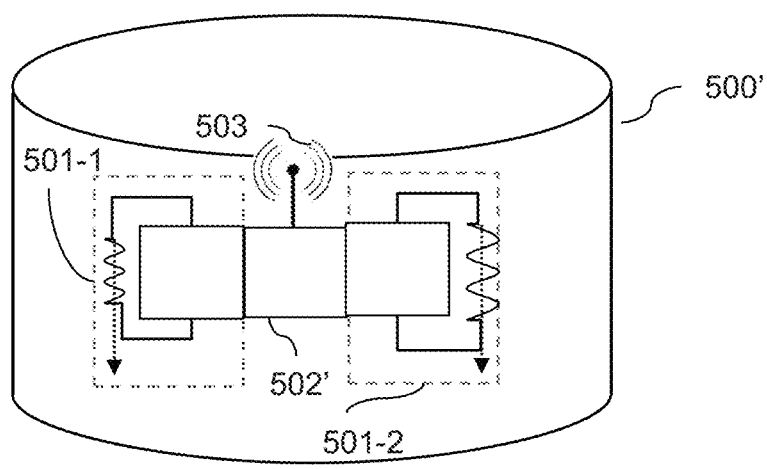

FIGS. 5*a* and 5*b* are diagrams of two examples of hybrid mobile entities of which the position may be determined and of which the position and the orientation may be determined, respectively, in accordance with particular embodiments of the invention.

The hybrid mobile entity 500 represented in FIG. 5*a* comprises a single location module 501. As illustrated, the location module comprises a solenoid. The radial axis of the solenoid is advantageously perpendicular to the plane of the floor entity in order for the radiation of the solenoid to propagate optimally towards that surface.

This hybrid mobile entity 500 further comprises an inertial measurement unit 502 rigidly joined to the location module 401, as well as a communication system 503 for sending data relative to the movement of the inertial measurement unit 502.

The three-dimensional position of the hybrid mobile entity 500, comprising a single solenoid, may be computed in accordance with the invention, as described above. As a matter of fact, on the basis of the movement data of the rigidly joined inertial measurement unit 502 and/or on the basis of the signal emitted by the solenoid of the location module 501, it is possible to compute the hybrid position at any time. When several mobile entities are present on the detection surface 210, the position of each hybrid mobile entity is determined sequentially.

The hybrid mobile entity 500' represented in FIG. 5*b* comprises two independent location modules 501-1 and 501-2. Again, as illustrated, the radial axis of the solenoids is advantageously perpendicular to the plane of the detection surface in order for the electromagnetic radiation of the solenoid to propagate optimally towards that surface.

This hybrid mobile entity 500' further comprises an inertial measurement unit 502' rigidly joined to the location modules 501-1 and 501-2, 25 as well as a communication system 503' for sending data relative to the movement of the inertial measurement unit 502'.

Each solenoid 501-1 and 501-2 of the hybrid mobile entity 500' can be activated independently of the other, sequentially. Thus, it is possible to determine the position of the hybrid mobile entity 500' by determining the position of each solenoid of the location modules 501-1 and 501-2 and by knowing their position in the hybrid mobile entity 500'. Similarly, it is possible to know the orientation of that hybrid mobile entity based on the relative positions of the solenoids of the location modules 501-1 and 501-2 and on their position in the hybrid mobile entity 500'. It should be observed here that the use of the coordinates of the solenoids of the location modules 501-1 and 501-2, in the plane of the detection surface, makes it possible to determine the orientation of the hybrid mobile entity 500' in that plane while the use of the altitude of the solenoids of the location modules 501-1 and 501-2 enables the pitch of the hybrid mobile entity 500' to be computed.

The three-dimensional position and orientation of the hybrid mobile entity 500', comprising two solenoids, may be computed in accordance with the invention, as described above. As a matter of fact, on the basis of the movement data of the inertial measurement unit 502' and/or on the basis of the signals emitted sequentially by the solenoids of the location modules 501-1 and 501-2, it is possible to compute the hybrid position at any time. When several mobile entities are present on the detection surface 210, the position of each hybrid mobile entity is determined sequentially.

It is noted here that hybrid mobile entities comprising a single solenoid and comprising two solenoids may be used conjointly on a detection surface provided that the intelligence thereof is capable of activating each solenoid independently of the others.

The sensing of the orientation of hybrid mobile entities may thus be obtained by providing each hybrid mobile entity with at least two location modules (which must not be aligned along a perpendicular to the detection surface) and by defining an identification rule for those location modules.

The sequential activation of the location modules, by the floor entity, makes it possible to estimate the position and/or the orientation of a plurality of hybrid mobile entities provided with those location modules.

When a location module receives an activation command dedicated to it, it triggers an electromagnetic emission. The detection system, knowing the identification of the location module in course of emission, can then link the computed position information to the identifier of the location module.

It is thus possible to construct a table containing, for each hybrid mobile entity, an identifier, an x-coordinate, a y-coordinate and, preferably an altitude in a frame of reference of the detection surface.

The sequential activation of the electromagnetic emission of the location modules enables the use of a single emission frequency for all the hybrid mobile entities managed by the system.

FIG. 6 is a diagram of the logic blocks of a hybrid mobile entity of which the position may be determined from an interfacing device (or floor entity) as illustrated in FIG. 2.

Such a hybrid mobile entity is, preferably, autonomous both as regards its electrical supply and as regards the reception of signals for controlling electromagnetic emission.

In this example, a hybrid mobile entity is considered which comprises a single location module, as in FIG. 5*a*. The person skilled in the art will without difficulty be able to adapt the present teaching to a hybrid mobile entity comprising two or more location modules (as represented in FIG. 5*b*).

The hybrid mobile entity comprises an electrical supply module 601 providing a voltage for all the components of the location module as well as a HF receiver and activation command detector 602 which receives and demodulates a signal, for example a HF signal, emitted by an external module of the floor entity, to determine whether the signal received concerns the activation of that location module. As described above, such a detection may be carried out by the comparison of a received identifier with an identifier stored in memory in advance.

The hybrid mobile entity 600 further comprises a switch 603, controlled by the HF receiver and activation command detector 602, as well as a selective amplifier 604 controlled by the switch 603. Lastly, the hybrid mobile entity 600 comprises a local oscillator 605 generating a frequency, which is preferably fixed, stable and of square-wave type, and a solenoid 606.

The hybrid mobile entity 600 also comprises an inertial measurement unit 607 and a communication system 608 configured to communicate with the communication means 228 of the floor entity 101. As a variant, the communication system 608 could be attached to or combined with the HF receiver and activation command detector 602 and communicate with the HF emitter 227 of the floor entity.

The hybrid mobile entity comprises a processing unit 609 configured to retrieve the raw movement data from the inertial measurement unit 607, store them in a memory of the hybrid mobile entity (not shown) and to actuate their sending via the communication system 608.

In some embodiments, for example such as that described with reference to FIGS. 4*c* and 4*d*, the processing unit 609 is configured to implement hybrid computations of position information items as are described earlier.

As a variant, the inertial measurement unit 607 may incorporate such an intelligence, that is to say integrate the processing unit 609.

The selective amplifier 604 generates, according to the position of the switch 603 and based on the signal from the local oscillator 605, a sinusoid voltage at the terminals of the solenoid 606, enabling the solenoid 606 to generate a certain amount of radiation power.

Several types of electrical supply 601 may be used. The supply may be obtained from a rechargeable battery and a standard control circuit. It may also be obtained from a battery and a voltage regulator making it possible to obtain a constant voltage throughout a range of use of the battery.

This solution is particularly advantageous when the system must compute the altitude of hybrid mobile entities utilized.

The supply may also be provided indirectly, by remote powering coupled with the use of energy supply means.

According to this embodiment, a layer of dedicated radiating solenoids is placed under the detection surface. These solenoids are passed through by a sinusoid signal and the power emitted by each solenoid is sufficient to remotely power the location modules positioned above it. The location modules are also equipped with a solenoid for receiving, by induction, the signal emitted by the solenoids present under the detection surface. Other means for remote powering may be used, for example antennae using the Powercast technology (Powercast is a trademark).

The energy storage means for example comprise a high-capacity capacitor which is charged from the solenoid of the location module. The capacitor is used as a voltage source to supply the other modules.

Alternatively, the energy storage means comprise a battery present in the hybrid mobile entity, for example a lithium battery. The solenoid of the location module then continually recharges that battery as soon as an induced current passes through it. A charge/discharge protection circuit is advantageously associated with the battery in order for it to remain within its range of acceptable voltages. If the altitude of mobile entities is to be evaluated, the voltage source is, preferably, regulated in order for the supply voltage to be constant for a duration of use of that voltage source, that is to say for an estimation of position and/or orientation of the hybrid mobile entity.

The hybrid mobile entities situated on a detection surface and used conjointly may use different types of power supply.

Furthermore, when a hybrid mobile entity comprises more than one location module, certain components, in particular the electrical supply, may be common to some or all of the location modules.

Figure 7:
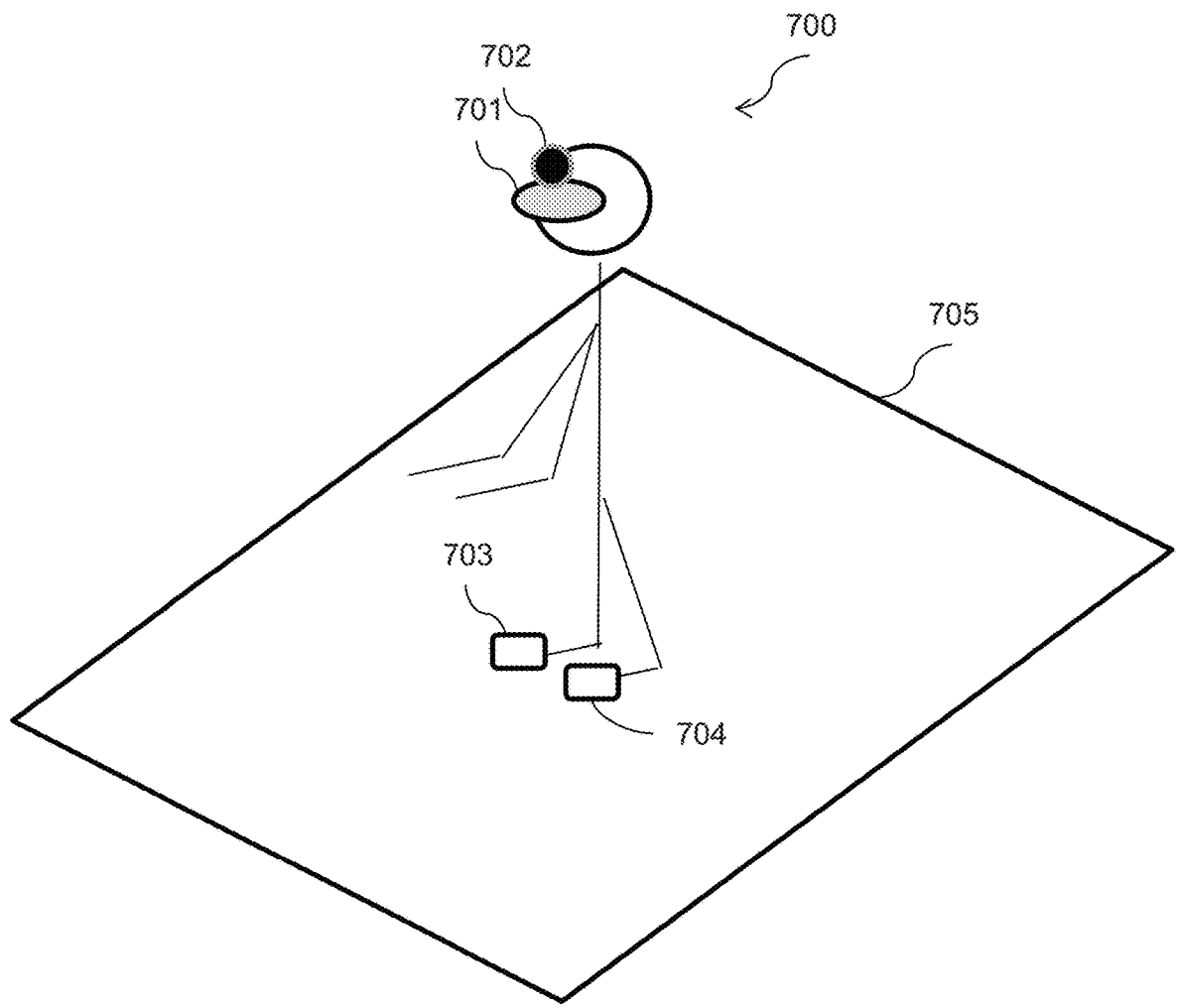
FIGS. 7, 8 and 9 illustrate three examples of applications in which hybrid mobile entities according to the invention may advantageously be used.

FIG. 7 illustrates an application example in which hybrid mobile entities according to the invention may advantageously be used.

In an environment 700, the user is equipped with an augmented reality or virtual reality system comprising a set of headgear 701, for example of HMD type (HMD standing for Head-Mounted Display).

This system for example comprises an inertial measurement unit 702 rigidly joined to the headgear 701 and integrating for example one or more magnetometers, accelerometers, rate gyros. Thus, the movement data provided by the inertial measurement unit 702 make it possible to describe the movement of the headgear 701 according to several degrees of freedom, for example six degrees of freedom.

In this example, the user is equipped on each foot with a hybrid mobile entity 703 and 704 as described above and moves over a floor entity 705 similar to the floor entity 101 described above. It is to be recalled here that the invention is however not limited to an interfacing device located on the floor, but that it also covers cases in which the interfacing device is disposed on side walls or on the ceiling.

Thus, by application of the methods described earlier, it is possible to follow the position of both the user's feet within the frame of reference of the floor entity 705.

Advantageously, the position data thus obtained make it possible to adjust the inertial measurement unit 702 located in the headgear 701.

For example, assuming that the user moves such that the distance D between the headgear 701 and the floor entity 705 is constant, the inertial measurement unit 702 can be adjusted using position information items computed at the user's feet, the component in the direction perpendicular to the plane of the floor entity being translated from the distance D.

As a variant, it is possible to place an altitude measuring means (barometer or range-finder) in the headgear 701. This enables the data of the inertial measurement unit 702 to be adjusted, even if the altitude (distance D) varies over time.

The adjustment of the inertial measurement unit 702 may thus be made more precisely if an inverse kinematic model linked to the human body is employed.

It is to be recalled that inverse kinematics make it possible for example, for a human model, to determine the torsion of the spinal column, ankles, knees, neck or of any other joint of the human body, from the trajectories or from the positions of the hands or feet. Rather than manually specify a set of joint coordinates, an inverse kinematic model makes it possible to formulate a skeletal movement on the basis of its significant components, for example for example the respective path of the hands or of the feet, the orientation of the pelvis.

When the inverse kinematic model is used, the knowledge of the position data of feet by the hybrid mobile entities 703 and 704 as well as the data provided by the inertial measurement unit 702 makes it possible to compute the position of the different parts which compose the human body (legs, spinal column, neck, head). A more accurate position of the item 702 relative to the items 703 and 704 by virtue of this inverse kinematic model is thus obtained.

Figure 8:
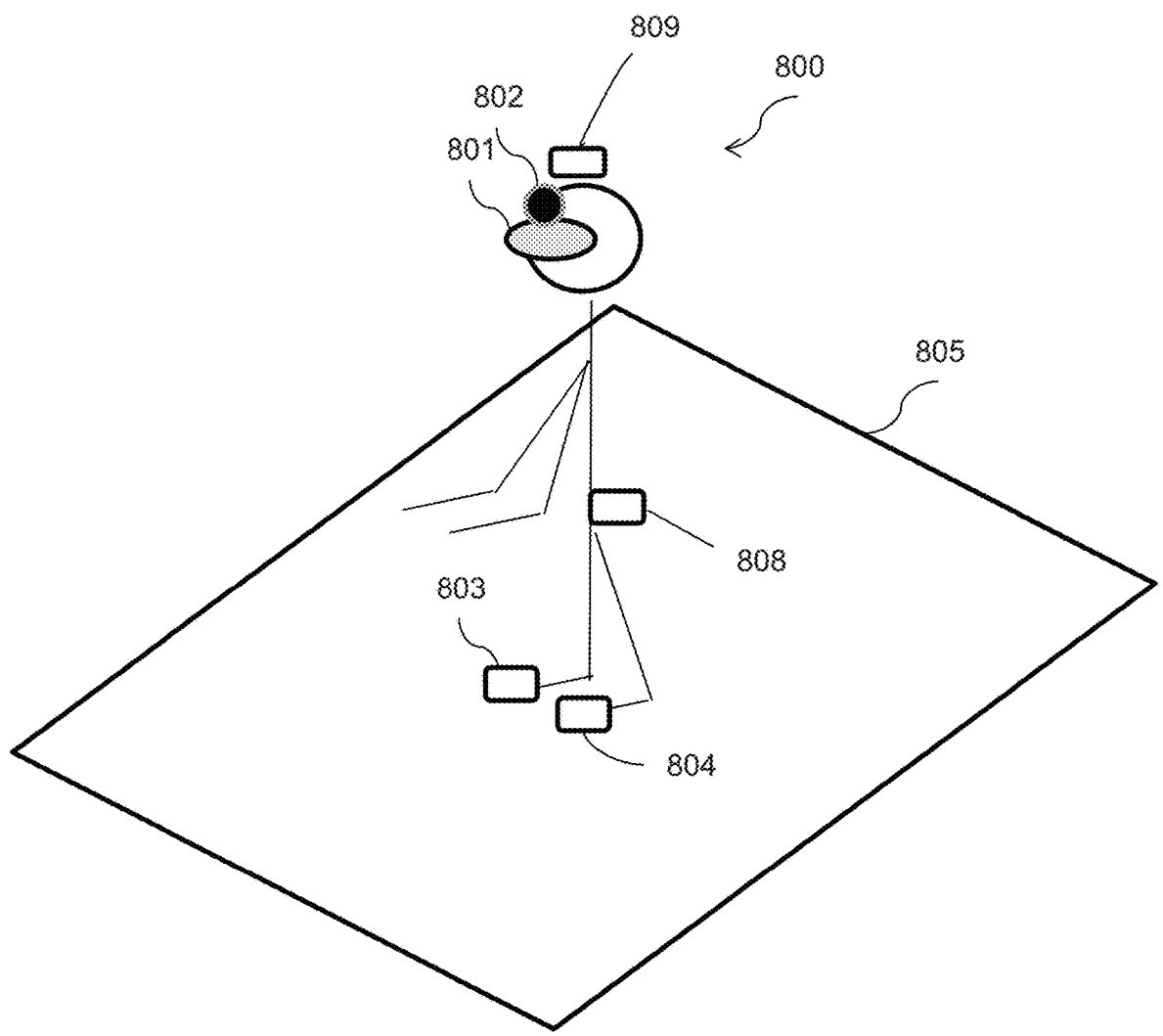
Figure 9:
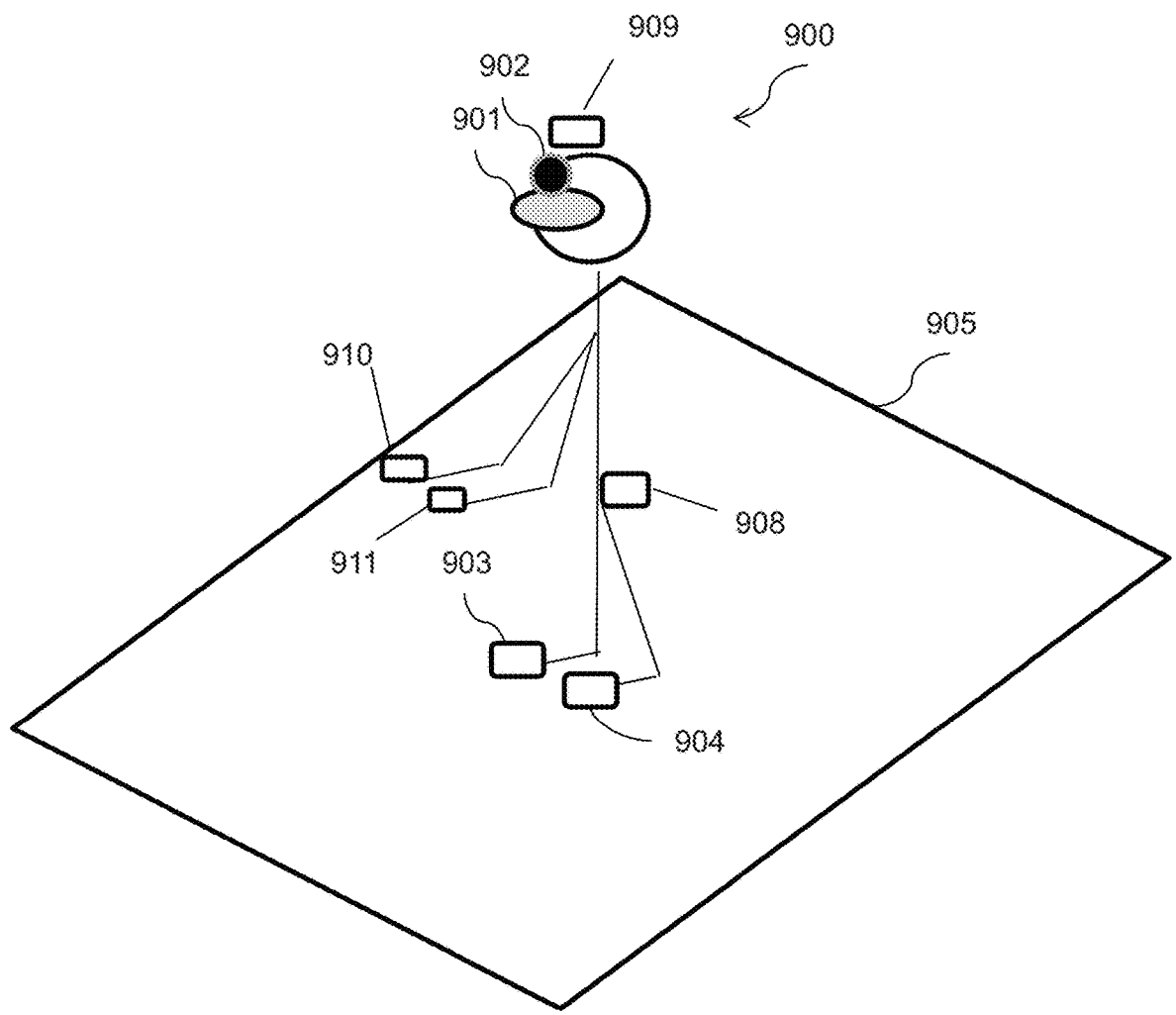

FIGS. 8 and 9 illustrate variant embodiments of FIG. 7, whereby it is possible to compute the position of the different parts of the human body of the user more accurately. Of course, the invention can also advantageously apply to the precise location of the different members of a robot or of any other complex object, for example articulated.

In the examples represented in FIGS. 8 and 9, the user moves in an environment 800 (FIG. 8), respectively 900 (FIG. 9). She is equipped with a system of augmented or viral reality comprising a headgear 801 (FIG. 8), respectively 901 (FIG. 9), similar to 701 (FIG. 7). This is for example a headgear set of HMD type (HMD standing for Head-Mounted Display).

Also the system comprises an inertial measurement unit 802 (FIG. 8), respectively 902 (FIG. 9), similar to 702 (FIG. 7), rigidly joined to the headgear 801, respectively 901. The inertial measurement unit for example integrates one or more magnetometers, accelerometers, rate gyros.

Thus, the movement data provided by the inertial measurement unit 802 and respectively 902 make it possible to describe the movement of the headgear 801 and respectively 901 according to several degrees of freedom, for example six degrees of freedom.

The user is furthermore equipped on each foot with a hybrid mobile entity 803 and 804 (FIG. 8), and respectively 903 and 904 (FIG. 9) similar to 703 and 704 (FIG. 7) and moves over a floor entity 805 (FIG. 8) and respectively 905 (FIG. 9), similar to 705 (FIG. 7).

In the example of FIG. 8, the user is furthermore equipped on her belt with another inertial measurement unit 808, and on the headgear 801, with a means 809 for measuring the altitude of the headgear 801 for example such as a range-finder or barometer.

A range-finder directed upwardly for example makes it possible to measure the distance of the user's head relative to the ceiling and ultimately compute the altitude of the user's head by knowing the floor/ceiling distance. As for a barometer, this enables the altitude to be measured by the air pressure.

Advantageously, by application of the methods described earlier, it is possible to follow the position of both the user's feet, equipped with the hybrid mobile entities 803, 804, within the frame of reference of the floor entity 805.

The knowledge of the altitude of the user's head by virtue of the means 809 makes it possible to know the position of the headgear even if the distance D between the headgear 801 and the floor entity varies in real time, which occurs for example when the user gets down or jumps relative to the surface entity 805.

The data provided by the inertial measurement unit 802 may be adjusted using position information items computed at the user's feet, the component in the direction perpendicular to the plane of the floor entity being translated from the distance D which varies dynamically.

The adjustment of the inertial measurement unit 802 may thus be made more precisely if an inverse kinematic model linked to the human body is employed. In this case the knowledge of the position data of the feet by the hybrid mobile entities 803 and 804 as well as the data provided by the inertial measurement unit 802 make it possible to compute the position of the different parts which compose the human body (legs, spinal column, neck, head), it being understood that the different entities 801 to 804, 808 and 809 are capable of communicating with each other.

Thus, the inertial measurement unit 808 enables an inverse kinematic model to be obtained that is still more accurate, since it makes it possible to obtain position data of the middle of the body and thus increases the accuracy of the inverse kinematic model.

In the example of FIG. 9, the user is equipped with a magnetic system (constant or pulsed magnetic fields) constituted by a magnetic emitter 908 emitting a magnetic field in a plurality of directions (preferably in three perpendicular directions) as well as a plurality of magnetic receivers (sensors) 909, 910 and 911. For example, such a system is known under the name Polhemus Fastrak (Polhemus Fastrak is a trademark) and Razer Hydra (Razer Hydra is a trademark).

The emitter comprises for example three solenoids each emitting a magnetic field in orthogonal directions.

As represented in FIG. 9, the emitter 908 is for example located on the user's belt. The receiver 909 is located at the user's head, for example on the headgear 901. The receivers 910 and 911 (which are for example joysticks) are located in the user's hands. In its principle, the magnetic system (constituted by the elements 908 to 911) makes it possible to obtain the coordinates of each receiver 909, 910 and 911, within the frame of reference of the emitter 908, reliably and deterministically.

The different entities 901 (headgear), 903 (hybrid mobile entity), 904 (hybrid mobile entity) and 908 (magnetic emitter) communicate together.

The position of the emitter 908 relative to the feet equipped with the hybrid mobile entities 903 and 904 may be obtained by assuming that the distance D between the emitter 908 and the floor entity 905 is constant. Thus the component of the position of the emitter 908 in the direction perpendicular to the plane of the floor entity 905 may be obtained simply by a translation of the distance D.

According to a variant, it is possible to place a rangefinder or a barometer (similar to 809 in FIG. 8) at the location of the emitter 908, in order to measure a dynamic altitude, that is to say a distance D that is variable between the emitter 908 and the floor entity 905. This is in particular advantageous for the cases in which the user jumps or gets down relative to the floor entity 905.

Thus, methods according to the invention make it possible to compute the position of the emitter 908 in the frame of reference of the floor entity 905.

Furthermore, it is possible to know the respective positions of the receivers 909, 910 and 911 in that same frame of reference, by virtue of the reception of the coordinates of the receivers in the frame of reference of the emitter 908.

Advantageously, by virtue of the use of the described magnetic system, the positions of the user's hands (receivers 910 and 911) can be known in real time and the knowledge of the position of the head (receiver 909) makes it possible to adjust the data of the inertial measurement unit 902 with very high accuracy in the frame of reference of the floor entity 905, for example as described above with reference to step 406 of FIG. 4a.

Of course, the adjustment of the inertial measurement unit 902 may thus be made more precisely if an inverse kinematic model linked to the human body is employed. In this case, the knowledge of the position data of the feet by the hybrid mobile entities 903 and 904 as well as of the data provided by the inertial measurement unit 902 and the position of the receiver 909 in the frame of reference of the floor entity 905 enable the position of the different parts that compose the human body (legs, spinal column, neck, head) to be computed.

Thus, in the examples of FIGS. 8 and 9, the knowledge of the position data of the feet by the hybrid mobile entities (803 and 804 in FIGS. 8; 903 and 904 in FIG. 9) as well as the data provided by the inertial measurement units (802 and 808 in FIG. 8, 902 in FIG. 9) and of the magnetic system (FIG. 9), make it possible to reliably compute the position of different parts of the human body (legs, spinal column, neck, head). A more accurate position of the headgear (801, 901) is thus obtained as well as of the other items of equipment relative to the hybrid mobile entities 803, 804, respectively 903, 904.

Naturally, to satisfy specific needs, a person competent in the field of the invention will be able to apply modifications to the preceding description.

The invention claimed is:

1. A hybrid mobile entity for a device for interfacing a plurality of mobile entities with a computer system, said hybrid mobile entity comprising:
    at least one location module comprising:
        an emitter configured to emit an electromagnetic signal to enable computing a position of said location module, and
        a receiver configured to receive an activation signal, and, according to at least one item of information of said activation signal, activating said emitter;
    an inertial measurement unit rigidly joined to said location module; and
    a communication system configured to communicate with said device, to transmit data relative to a movement of the inertial measurement unit, the communication system being configured to receive adjustment data for adjusting the movement data of the inertial measurement unit, said adjustment data being based on a position information item computed from an electromagnetic signal emitted by said location module.

2. The hybrid mobile entity according to claim 1, wherein the communication system is configured to receive at least one position information item of said location module.

3. The hybrid mobile entity according to claim 2, further comprising one or more processors configured to perform hybrid computation of a new position information item of said location module, based on the position information item received and movement data of the inertial measurement unit.

4. The hybrid mobile entity according to claim 3, wherein the communication system is configured to transmit said new position information item of said location module.

5. The hybrid mobile entity according to claim 1, wherein the hybrid mobile entity is configured to adjust the movement data of the inertial measurement unit at each activation of said location module.

6. The hybrid mobile entity according to claim 1, further comprising a remote powering system configured to electrically power components of said location module.

7. The hybrid mobile entity according to claim 1, further comprising an energy storage.

8. A set for a virtual or augmented reality system, adapted to equip a moving user, said system comprising:
    at least one hybrid mobile entity for a device for interfacing a plurality of mobile entities with a computer system, configured to be carried by the user, said hybrid mobile entity comprising at least one location module comprising:
        an emitter configured to emit an electromagnetic signal to enable computing a position of said location system, and
        a receiver configured to receive an activation signal, and, according to at least one item of information of said activation signal, activating said emitter;
    an inertial measurement unit rigidly joined to said location module;
    a communication system configured to communicate with said device, to transmit data relative to a movement of the inertial measurement unit;
    at least one interfacing device according to claim 1; and
    a set of virtual or augmented reality headgear, adapted to be worn by the user, said headgear being connected to said hybrid mobile entity or to said interfacing device so as to enable the tracking of the position of the headgear according to the relative position of the hybrid mobile entity and of the headgear and according to the position of the hybrid mobile entity.

9. The set according to claim 8, further comprising a magnetic positioning system comprising a magnetic field emitter configured to emit a magnetic field in a plurality of directions and a plurality of receivers of said magnetic field emitted by the emitter, said magnetic positioning system being configured to determine the position of at least one of the receivers in a frame of reference centered on the emitter, based on the magnetic field received by said one receiver.

10. A device for interfacing a plurality of hybrid mobile entities with a computer system, the device comprising:
    a detection surface;
    an activation device configured to sequentially activate at least one location module integrated into each hybrid mobile entity of said plurality of hybrid mobile entities, a single location module being able to be activated at a particular time;
    a receiver configured to receive at least one electromagnetic signal from said at least one activated location module;
    one or more processors configured to compute in real time, from said at least one received electromagnetic signal, at least one position information item, in a frame of reference associated with said detection surface, of a hybrid mobile entity comprising said activated location module; and
    a communication system configured to receive data relative to a movement of an inertial measurement unit rigidly joined to said at least one activated location module in the absence of reception of an electromagnetic signal on activation of said at least one location module, the communication system being configured to transmit adjustment data for adjusting the movement data of the inertial measurement unit, said adjustment data being based on a position information item computed from a received electromagnetic signal,
    wherein the one or more processors is configured to perform hybrid computation in real time, from received movement data and from the computed position information item, of a new position information item of said at least one activated location module.

11. The device according to claim 10, wherein the communication system is configured
    to transmit the position information item computed from the received electromagnetic signal, to the hybrid mobile entity, and
    to receive said new position information item, computed by the hybrid mobile entity from the transmitted position information item.

12. A control system comprising:
    a plurality of the interfacing devices according to claim 10, wherein a device of said plurality of interfacing devices controls one or more of the activation device, the receiver, the one or more processors, and the communication system implemented in the other interfacing devices of said plurality of interfacing devices.

13. A method for interfacing a plurality of hybrid mobile entities with a computer system, the method further comprising:
    obtaining at least one position information item of a hybrid mobile entity of said plurality of hybrid mobile entities, said hybrid mobile entity comprising at least one activated location module, the at least one position information item being computed from at least one electromagnetic signal emitted by said at least one activated location module integrated into the hybrid mobile entity, only one location module configured to be activated at a particular time;
    next, in the absence of later reception of an electromagnetic signal on activation of said at least one location module:
        obtaining data relative to a movement of an inertial measurement unit rigidly joined to said at least one activated location module, and receiving adjustment data for adjusting movement data of the inertial measurement unit, said adjustment data being based on a position information item computed from a received electromagnetic signal; and
        performing hybrid computation in real time, from obtained movement data and from the obtained position information item, of a new position information item of said at least one activated location module.

14. The method according to claim 13, further comprising adjusting the movement data of the inertial measurement unit.

15. The method according to claim 14, further comprising storing said obtained position information item with the date of computation, said adjusting being implemented on the basis of said stored position information item.

16. The method according to claim 14, further comprising receiving an information item indicating a failure in reception of an electromagnetic signal from said at least one activated location module.

17. The method according to claim 16, wherein the adjusting is implemented on the basis of the received adjustment data.

18. The method according to claim 17, further comprising transmitting the new computed position information item.

* * * * *